US007769214B2

(12) United States Patent
Wehrli et al.

(10) Patent No.: US 7,769,214 B2
(45) Date of Patent: Aug. 3, 2010

(54) METHOD FOR MEASURING STRUCTURAL THICKNESS FROM LOW-RESOLUTION DIGITAL IMAGES

(75) Inventors: Felix W. Wehrli, Bala Cynwyd, PA (US); Punam K. Saha, Coralville, IA (US); Bryon Gomberg, San Francisco, CA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 899 days.

(21) Appl. No.: 10/728,496

(22) Filed: Dec. 5, 2003

(65) Prior Publication Data

US 2004/0114789 A1 Jun. 17, 2004

Related U.S. Application Data

(60) Provisional application No. 60/431,129, filed on Dec. 5, 2002.

(51) Int. Cl.
*G06K 9/00* (2006.01)
(52) U.S. Cl. .................... 382/128; 382/131; 382/132
(58) Field of Classification Search .............. 382/128, 382/131, 132
See application file for complete search history.

(56) References Cited

U.S. PATENT DOCUMENTS 6,175,655 B1* 1/2001 George et al. ............... 382/257
2003/0112921 A1* 6/2003 Lang et al. .................. 378/54
2005/0031179 A1* 2/2005 Wehrli et al. ............... 382/131

OTHER PUBLICATIONS

Gomberg, B.—"Fuzzy Distance Transform: Theory, algorithms, and applications"—Computer Vision and Image Understanding 86—2002, pp. 171-190.*
Gomberg, B.—"In vivo magnetic resonance-based vrtual bone biopsy"—Dissertation, 2002, pp. 1-3.*
Gomberg, B.—"Novel theory and algorithm for fuzzy distance transform and its applications"—SPIE Medical Imaging 2002, pp. 134-145.*
Song, H.—"Integrated Processing System for In vivo MR images of trabecular bone networks"—Proc. Intl. Soc. Mag. Reson. Med 9—2001, p. 845.*
Portal, The ACM Digital Library—Abstract Source Reference for "Fuzzy distane transform: theory, algorithms, and applications".*

(Continued)

*Primary Examiner*—Bhavesh M Mehta
*Assistant Examiner*—Bernard Krasnic
(74) *Attorney, Agent, or Firm*—Montgomery, McCracken, Walker & Rhoads, LLP; Evelyn H. McConathy

(57) ABSTRACT

Provided are fuzzy distance transform-based methods, and an algorithm therefor, for analyzing digital images defining a volumetric region of an object from a digital image comprising finding a set of points in the image to generate a fuzzy subset, and calculating the fuzzy distance transform (FDT) of the fuzzy subset. The methods deal with the extraction of object features from digital images acquired at low resolution, specifically, the measurement of structural thickness distribution along an object. Targeted applications comprise, but are not limited to, the measurement of trabecular bone thickness in magnetic resonance or computed tomography images. Also provided are systems and device for utilizing the disclosed methods and algorithm to extract the object features from the digital images.

21 Claims, 20 Drawing Sheets

OTHER PUBLICATIONS

CSA Illumina—Abstract Source Reference for "Fuzzy distane transform: theory, algorithms, and applications".*

Wang, X.—"Some sequential algorithms for a generalized distance transformation based on minkowski operations"—IEEE—1992, pp. 1114-1121.*

Takahashi, M.—"Trabecular bone thickness from in vivo MRI using Fuzzy Distance Transform"—Proc. Intl. Soc. Mag. Reson. Med. 10, May 18-24, 2002.*

Borgefors, G.—"Fuzzy border distance transforms and their use in 2D skeletonization"—IEEE, Aug. 2002, pp. 180-183.*

Aaron, J.E., Makins, N.B., and Sagreiya, K., "The microanatomy of trabecular bone loss in normal aging men and women," *Clinical Orthopaedics Related Res.* 215:260-271 (1987).

Bogomolny, A. "On the perimeter and area of fuzzy sets," *Fuzzy Sets Systems* 23:257-269 (1987).

Borgefors, G., "Distance transformations in arbitrary dimensions," *Comput. Vision Graphics Image Process.* 27:321-345 (1984).

Borgefors, G., "On digital distance transformation in three dimensions," *Comput. Vision Image Understanding* 64:368-376 (1996).

Bradbeer, J.N., Arlot, M.E., Meunier, P.J., Reeve, J., "Treatment of osteoporosis with parathyroid peptide (hPTH 1-34) and oestrogen: increase in volumetric density of iliac cancellous bone may depend on reduced trabecular spacing as well as increased thickness of packets of newly formed bone," *Clin. Endocrinol. (Oxf)* 37:282-289 (1992).

Dalle Carbonare, L., Arlot, M.E., Chavassieux, P.M., Roux, J.P., Portero, N. R., Meunier, P.J., "Comparison of trabecular bone microarchitecture and remodeling in glucocorticoid-induced and postmenopausal osteoporosis," *J. Bone Miner. Res.* 16:97-103 (2001).

Danielsson, P.E., "Euclidean distance mapping," *Comput. Graphics Image Process.* 14:227-248 (1980).

Fu, K.S., and Rosenfeld, A., "Pattern recognition and image processing," *IEEE Trans. Comput.* 25:1336-1346 (1976).

Hildebrand, T., and Ruegsegger, P., "A new method for the model independent assessment of thickness in three-dimensional images," *J. Microscopy* 185:67-75 (1997).

Hwang, S.N., and Wehrli, F.W., "Estimating voxel volume fraction of trabecular bone on the basis of magnetic resonance images acquired in vivo," *Internat. J. Imaging Systems Tech.* 10:186-198 (1999).

Kaufmann, A., "Introduction to the Theory of Fuzzy Subsets," vol. 1, *Academic Press*, New York (1975).

Kong, T.Y., Roscoe, A.W., and Rosenfeld, A., "Concepts of digital topology," *Topology Appl.* 46:219-262 (1992).

Ma, J., Wehrli, F.W., and Song, H.K., "Fast 3D large-angle spin-echo imaging (3D FLASE)," *Magnet. Reson. Med.* 35:903-910 (1996).

Pal, N.R., and Pal, S.K., "A review of image segmentation techniques," *Pattern Recog.* 26:1277-1294 (1993).

Parfitt, M., Mathews, C. H. E., Villanueva, A. R., Kleerekoper, M., Rame, B., and Rao, D. S., "Relationships surface, volume, and thickness of iliac trabecular bone in aging and in osteoporosis. Implications for the microanatomic and cellular mechanisms of bone loss," *J. Clin. Invest.* 72:1396-409 (1983).

Pizer, S.M., Eberly, D., Fritsch, D.S., and Morse, B.S., "Zoom-invariant vision of figural shape: The mathematics of cores," *Comput. Vision Image Understanding* 69:55-71 (1998).

Pothuaud, L., Porion, P., Lespessailles, E., Benhamou, C.L., and Levitz, P., "A new method for three-dimensional skeleton graph analysis of porous media: application to trabecular bone microarchitecture", *J. Microsc.* 199:149-161 (2000).

Rosenfeld, and Pfaltz, J., "Distance functions in digital pictures," *Pattern Recog.* 1:33-61 (1968).

Rosenfeld, "The diameter of a fuzzy set," *Fuzzy Sets Systems* 13:241-246 (1984).

Rosenfeld, "The fuzzy geometry of image subsets," *Pattern Recog. Lett.* 2:311-317 (1991).

Rosenfeld, "Fuzzy digital topology," *Inform. Control* 40:76-87 (1979).

Ruegsegger, P., Koller, B., and Muller, R., "A. microtomographic system for the nondestructive evaluation of bone architecture," *Calcified Tissue International* 58:24-29 (1996).

Saha, P.K., Udupa, J.K., and Odhner, D., "Scale-based fuzzy connected image segmentation: Theory, algorithms, and validation," *Comput. Vision Image Understanding* 77:145-174 (2000).

Saha, P.K, Chaudhuri, B.B., and Dutta Majumber, D., "A new shape preserving parallel thinning algorithm for 3D digital images," *Pattern Recog.* 30:1939-1955 (1997).

Saha, P.K., Udupa, J.K., and Abrahams, J.M., "Automatic bone-free rendering of cerebral aneurysms via 3D-CTA," in *Proceedings of SPIE: Medical Imaging*, San Diego, CA, 4322:1264-1272 (2001).

Saha, P.K., Gomberg, B.R., and Wehrli, F.W., "A novel theory and algorithm of fuzzy distance transform and its applications," in *Proceedings of SPIE: Medical Imaging*, San Diego, CA, 4684:134-145 (2002).

Saha, P.K., Wehrli, F.W., and Gomberg, B.R., "Fuzzy distance transform—theory, algorithms, and applications," *Computer Vision and Image Understanding* 86:171-190 (2002).

Saha, P.K., and Chaudhuri, B.B., "3D Digital topology under binary transformation with applications," *CVGIP: Image Understanding* 63:418-429 (1996).

Saha, P.K., Chaudhuri, B.B., and Dutta Majumder, D., "A new shape preserving parallel thinning algorithm for 3D digital images." *Pattern Recognition* 30:1939-1955 (1997).

Saha, P.K., and Chaudhuri, B.B., "Detection of 3D simple points for topology preserving transformation with application to thinning," *IEEE Transactions on Pattern Analysis and Machine Intelligence* 16:1028-1032 (1994).

Song, H.K., and Wehrli, F.W., "In vivo micro-imaging using alternating navigator echoes with applications to cancellous bone structural analysis," *Magnet. Resort. Med.* 41:947-953 (1999).

Srihari, S.N., and Udupa, J.K., "Understanding the bin of parts," in *Proceedings of International Conference on Cybernetics and Society*, Denver, Colorado, pp. 44-49 (1979).

Takahashi, M., Wehrli, F.W., Hilaire, L., Zemel, B.S., and Hwang, S.N., "In vivo NMR microscopy allows short-term serial assessment of multiple skeletal implications of corticosteroid exposure," *Proc. Natl. Acad. Sci. USA* 19:19 (2002).

Tsao, Y. And Fu, K.S., "A parallel thinning algorithm for 3D pictures," *Comput. Graphics Image Process.* 17:315-331 (1981).

Udupa, J.K., and Samarasekera, S., "Fuzzy connectedness and object definition: theory, algorithms, and applications in image segmentation," *Graphical Models Image Process.* 58:246-261 (1996).

J.K. Udupa and D. Odhner, "Shell rendering," *IEEE Comput. Graphics Appl.* 13(6):58-67 (1993).

Udupa, J.K., Odhner, D., Samarasekera, S., Goncalves, R.I., Iyer, K., Venugopal, K., and Furuie, S., "3DVIEWNIX: A open, transportable, multidimensional, multimodality, multiparametric imaging system," *Proc. SPIE* 2164:58-73 (1994).

Wehrli, F.W., Saha, P. K., Gomberg, B.R., Song, H.K., Snyder, P.J., Benito, M., Wright, A., and Weening, R., "Role of magnetic resonance for assessing structure and function of trabecular bone," *Topics in Magnetic Resonance Imaging* 13:335-356 (2002).

Wu, Z., Chung, H., and Wehrli, F.W., "A Bayesian approach to subvoxel tissue classification in NMR microscopic images of trabecular bone," *Magnetic Res. Med.* 31:302-308 (1994).

* cited by examiner (a)

(b)

(c)

(d)

(a)

(b)

(c)

(d)

(a) (b) (c)
(d) (e) (f)

METHOD FOR MEASURING STRUCTURAL THICKNESS FROM LOW-RESOLUTION DIGITAL IMAGES

CROSS REFERENCE TO RELATED APPLICATIONS

This application claims priority to U.S. Provisional Application No. 60/431,129 on Dec. 5, 2002, the content of which is herein incorporated in its entirety.

GOVERNMENT INTEREST

This invention was supported in part by Grant Nos. RO1 41443 and R21 47112 from the National Institutes of Health. Accordingly, the Government may have certain rights in this invention.

FIELD OF THE INVENTION

The invention deals with the extraction of object features from digital images acquired at low resolution, specifically, the measurement of structural thickness distribution along an object. Targeted applications comprise, but are not limited to, the measurement of trabecular bone thickness in magnetic resonance or computed tomography images.

BACKGROUND OF THE INVENTION

Effective tools for object shape analysis are important and useful in many imaging applications including medical ones. One such popular and widely used tool is the distance transform (DT) (Rosenfeld et al., *Pattern Recog.* 1:33-61 (1968); Danielsson, *Comput. Graphics Image Process.* 14:227-248 (1980); Borgefors, *Comput. Vision Graphics Image Process.* 27:321-345 (1984); Borgefors, *Comput. Vision Image Understanding* 64:368-376 (1996)) of an object. For a hard (binary) object, DT is a process that assigns a value at each location within the object that is simply the shortest distance between that location and the complement of the object.

However, until very recently this notion of hard DT have not been applicable on fuzzy objects in a meaningful way (Kaufmann, *Introduction to the Theory of Fuzzy Subsets*, Vol. 1, Academic Press, New York, 1975; Rosenfeld, *Inform. Control* 40:76-87 (1979); Bezdek and S. K. Pal, *Fuzzy Models for Pattern Recognition*, IEEE Press, New York, 1992). The notion of DT for fuzzy objects, called fuzzy distance transform (FDT), becomes more important in many imaging applications because it is often necessary to deal with situations with data inaccuracies, graded object compositions, or limited image resolution (on the order of an object's structure size).

The notion of fuzzy distance is formulated by first defining the length of a path on a fuzzy subset and then finding the infimum of the lengths of all paths between two points. For the fuzzy distance between two points x and y, the space n is defined as the "infimum" (Weisstein, *CRC Concise Encyclopedia of Mathematics*, Chapman & Hall/CRC, Boca Raton, Fla., 1999) of the lengths of all paths between them. The length of a path n in a fuzzy subset of the n-dimensional continuous space $\Re^n$ is defined as the integral of fuzzy membership values along π. Generally, there are an infinite number of paths between any two points in a fuzzy subset and it is often not possible to find the shortest path, if it exists. Thus, the fuzzy distance between two points is defined as the infimum of the lengths of all paths between them. It is demonstrated that, unlike in hard convex sets, the shortest path (when it exists) between two points in a fuzzy convex subset is not necessarily a straight-line segment. For any positive number $\theta \leq 1$, the θ-support of a fuzzy subset is the set of all points in $\Re^n$ with membership values greater than or equal to θ. It is shown that, for any fuzzy subset, for any nonzero $\theta \leq 1$, fuzzy distance is a metric for the interior of its θ-support.

The FDT is thus defined as a process on a fuzzy subset that assigns to a point its fuzzy distance from the complement of the support. The theoretical framework of FDT in continuous space is extended to digital cubic spaces and it is shown that for any fuzzy digital object, fuzzy distance is a metric for the support of the object. In general, FDT is useful, for example, in feature extraction (Fu et al., *IEEE Trans. Comput.* 25:1336-1346 (1976)), local thickness or scale computation (Pizer et al., *Comput. Vision Image Understanding* 69:55-71 (1998); Saha et al., *Comput. Vision Image Understanding* 77:145-174 (2000)), skeletonization (Srihari et al., in *Proceedings of International Conference on Cybernetics and Society*, Denver, Colo., pp. 44-49 (1979); Tsao et al., *Comput. Graphics Image Process.* 17:315-331 (1981); Saha et al., *Pattern Recog.* 30:1939-1955 (1997)), and morphological (Serra, *Image Analysis and Mathematical Morphology*, Academic Press, San Diego, 1982) and shape-based object analyses (Borgefors, "Applications of distance transformations," in *Aspects of Visual Form Processing* (Arcelli et al., eds.), pp. 83-108, World Scientific, Singapore, 1994). In particular, FDT may be useful in fault detection in integrated circuit chips or in computer motherboard circuits, analysis of the dynamics of a hurricane, etc. FDT will be useful in many medical imaging applications, such as computation of local thickness of trabecular bone or vessels, or morphology-based separation of anatomic structures having similar intensities, e.g., artery-vein separation.

Trabecular or cancellous bone—the type of bone that dominates in the vertebrae and at locations near the joints of long bones (metaphysis and epiphysis)—consists of a network of plates and struts. Bone atrophy as it occurs in osteoporosis, leads to either homogeneous or heterogeneous thinning of the trabecular elements. Besides changes in network connectivity (and thus of the topology of the network) the thickness of the trabeculae most critically determines the mechanical competence and thus resistance to fracture of trabecular bone. Accurate measurement of trabecular thickness is, therefore, of significant interest, for example, to assess the effectiveness of anabolic (bone forming) agents of patients with osteoporosis.

The classical approach toward measuring trabecular thickness has been based on histomorphometry of transiliac bone biopsies (Chavassieux et al., in *Osteoporosis*, 2 (Marcus et al., eds.) New York: Academic Press, pp. 501-509 (2001)). Typically, the perimeter of the trabeculae is measured in stained sections, and thickness is approximated as the bone area divided by one half of the perimeter (Parfitt et al., *J Clin. Invest.* 72:1396-409 (1983)). The emergence of imaging technologies, such as micro computed tomography (μ-CT) (Ruegsegger et al., *Calcified Tissue International* 58:24-29 (1996)) enables reconstruction of three-dimensional images calling for more elaborate techniques for measuring structural thickness.

One model-independent approach involves inscribing spheres into the structure (Hildebrand et al., *J. Microscopy* 185:67-75 (1997)) in such a manner that trabecular thickness at any location is computed as the diameter of the largest inscribed sphere containing that location. The implementation issues are solved using distance transform and the distance ridge, which provides the set of the center points of largest inscribed spheres. This approach is well suited for high-resolution images that can easily be segmented, but it is bound to fail when significant partial volume blurring is present. The latter is the case in images acquired in the limited spatial resolution regime of in vivo µ-MRI and µ-CT that are beginning to supplant bone biopsy-based methods for structural analysis of trabecular bone (see, e.g., Wehrli et al., *Topics in Magnetic Resonance Imaging* 13:335-356 (2002).

However, the fuzzy nature of these images, caused by partial volume blurring, virtually precludes binarization. Accordingly, until the present invention a long felt need has remained in this art for a method that obviates segmentation and that can effectively deal with images acquired at a voxel size comparable to the typical trabecular bone thickness. It is a goal therefore, to better understand the fuzzy distance transform (in both continuous and digital spaces), to study its properties, to present a dynamic programming-based algorithm to compute FDT for fuzzy digital objects, and to demonstrate practical applications of the FDT methods.

SUMMARY OF THE INVENTION

The present invention first provides the theory underlying the algorithm in the digital cubic space and the algorithm itself, and then further provides utilitarian demonstrations of the method for extracting structural thickness from fuzzy distance transform images. The robustness underlying the present FDT-based methods is shown in terms of CT images of human trabecular bone in low-resolution regimes, re-sampled at progressively coarser resolution, and after application of rotation and addition of noise (to simulate the in vivo situation). Reproducibility of embodiments of present methods is demonstrated on the basis of images from µ-CT volume data by comparing thickness histograms from individual sections from the same and from different subjects, as well as with MRI volume data sets from human volunteers imaged consecutively in different sessions. Using in vivo µ-MR images from prior animal studies, it is shown that short-term exposure to a bone atrophy-inducing agent results in trabecular thinning that can be quantified with a method of the present invention.

The theoretical framework of FDT is developed in the n-dimensional continuous space n. Consider a path $\pi$ over a fuzzy subset of n. Unlike the case of hard sets, the membership values of the points through which $\pi$ passes need to be considered to determine its length. Thus, in an embodiment it is illustrated that, unlike the case of hard convex sets, the shortest path (when it exists) between two points in a fuzzy convex subset is not necessarily a straight-line. For any positive number $\theta \leq 1$, the $\theta$-support of a fuzzy subset is the set of all points in $\Re^n$ with membership values greater than or equal to $\theta$.

In a further embodiment, it is shown that for any fuzzy subset, for any nonzero $\theta \leq 1$, fuzzy distance is a metric for the interior of its $\theta$-support.

It is also shown that, for any smooth fuzzy subset, fuzzy distance is a metric for the interior of its $\theta$-support (referred to as "support"). FDT is defined as a process on a fuzzy subset that assigns to a point its fuzzy distance from the complement of the support. The theoretical framework of FDT in the continuous space is extended to cubic digital spaces, and in a further embodiment it is shown that for any fuzzy digital object, fuzzy distance is a metric for the support of the object.

In another embodiment of the invention, a dynamic programming-based algorithm is presented for computing FDT of a fuzzy digital object. It is shown that the algorithm terminates in a finite number of steps and when it does so, it correctly produces the FDT image.

Further, exemplary applications for fuzzy distance transforms in medical imaging are presented, including the quantification of the thickness of vascular structures and of trabecular bone over a wide range of resolution regimes from µ-CT to in vivo µ-MRI data, performance of the method under object rotation, sensitivity to noise, reproducibility of thickness values, and efficacy. A resolution-dependent correction of average thickness has been shown to be effective in largely eliminating the systematic error resulting from failure to sample FDT values at the true skeleton locations. Further, FDT-derived thickness was found to be remarkably robust to noise, and the values were stable for SNR>5.

In addition, in an embodiment of the method has been shown to be reproducible in repeat MRI scans conducted in vivo demonstrating its applicability for longitudinal studies for the assessment of drug efficacy. Presented are several potential, exemplary applications of fuzzy distance transform in medical imaging, including quantification of blood vessels and trabecular bone thickness in the regime of limited special resolution where these objects become fuzzy.

Additional objects, advantages and novel features of the invention will be set forth in part in the description, examples and figures which follow, all of which are intended to be for illustrative purposes only, and not intended in any way to limit the invention, and in part will become apparent to those skilled in the art on examination of the following, or may be learned by practice of the invention.

BRIEF DESCRIPTION OF THE DRAWINGS

The foregoing summary, as well as the following detailed description of the invention, will be better understood when read in conjunction with the appended drawings. It should be understood, however, that the invention is not limited to the precise arrangements and instrumentalities shown.

FIG. 3(a) shows a 2D slice from a 3D CTA image of a patient's head. FIG. 3(b) shows a fuzzy object representing the bone structures in FIG. 3(a). The fuzzy object was constructed from the image of FIG. 3(a) by first thresholding the bone regions, and then by blurring and subsequently adding noise to it. FIG. 3(c) shows a FDT image of the fuzzy object in FIG. 3(b). As shown in this figure, the ridges of FDT values follow the medial axis of the fuzzy object.

FIG. 4(a) shows a MIP rendering of a 3D subvolume taken from a 3D CTA image of a patient's head (after removing bones), showing a portion of the carotid arterial tree. FIG. 4(b) shows a MIP projection of the fuzzily segmented arterial tree. FIG. 4(c) shows a MIP projection of the FDT image of the 3D image shown in FIG. 4(b). Mean and standard deviation of thickness values computed along the curve skeleton of the arterial tree mask are 2.74 mm and 1.8 mm, respectively.

FIG. 5a shows a 2D slice taken from the raw 3D MR image. The central highlighted disk represents the cross section with the cylindrical ROI used for computing thickness of the bone trabeculae. FIG. 5(b) shows a 3D projection of the BVF image computed over the ROI. Mean and standard deviation of the thickness values of trabecular bone over the selected ROI are 102 µm and 42 µm, respectively.

FIGS. 6(a), 6(b) show a fuzzy shell rendering of the 3D BVF image of trabecular bone networks for the two different specimens. FIGS. 6(c), 6(d) show two representative slices of the raw µ-CT image, one from each of the two samples shown in FIGS. 6(a) and 6(b). FIG. 6(e) shows two FDT-based thickness distributions, one from each of the two different slices (330 µm apart) chosen from the sample shown in FIG. 6(a). FIG. 6(f) is the same as FIG. 6(e), but for the sample in FIG. 6(b).

FIGS. 8(a) and 8(b) depict representative transverse µ-CT images of human distal radius trabecular bone specimens; while FIGS. 8(c) and 8(d) depict 3D surface-rendered BVF images. In the remaining Figures and discussion, the bone sample displayed in FIG. 8(c) is referred to as "sample A," and the cross-section in FIG. 8(a) is "slice A." Those displayed in FIGS. 8(b) and 8(d) are referred to as "sample B" and "slice B," respectively.

FIGS. 9(a) and 9(b) show slices A and B, as above, from the BVF images of samples A and B at 22 µm isotropic voxel size, respectively. FIGS. 9(c) and 9(d) show slices from the BVF images at 88 µm isotropic voxel size from samples A and B matching to slices A and B, respectively. FIGS. 9(e) and 9(f) show the same as FIGS. 9(c) and 9(d), respectively, but at 176 µm isotropic voxel size.

FIG. 11(a)=35°; FIG. 11(b)=125° and FIG. 11(c)=245°.

FIG. 13(a) (SNR=1). FIG. 13(b) (SNR=5(b)). FIG. 13(c) (SNR=10).

FIG. 16(a) shows a slice from an in vivo µ-MR image of a human distal radius acquired at 137×137×350 µm³ voxel size. The actual region for which thickness was computed was manually outlined; the boundary of this region is shown in white. FIG. 16(b) shows the region of interest zoomed from the scan in FIG. 16(a). FIG. 16(c) shows a BVF image derived from image within the VOI shown in FIG. 9(a). FIG. 16(d) shows a FDT image computed from the BVF-image in FIG. 16(c).

FIG. 17(a)=baseline, FIG. 17(b)=4-weeks, and FIG. 17(c)=8-weeks after onset of treatment. FIGS. 17(d) and 17(e) show computed BVF images corresponding to those in FIGS. 17(a)-17(c). It is noted that no corticosteroid-induced trabecular bone thinning is visually apparent.

DETAILED DESCRIPTION OF PREFERRED EMBODIMENTS OF THE INVENTION

Figure 1:
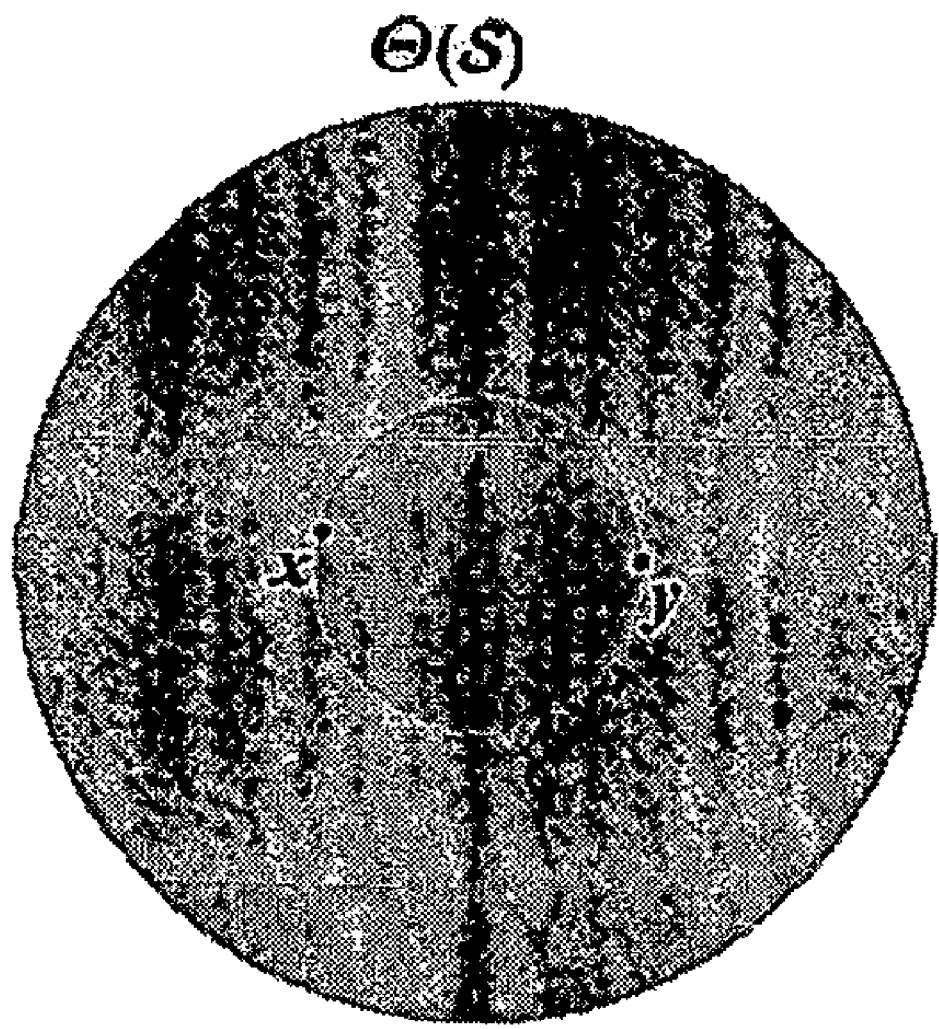
FIG. 1 depicts an example demonstrating that the shortest paths (when they exist) between two points in a convex fuzzy subset are not necessarily a straight-line segment. The support (S) of the fuzzy disk is the union of different shaded regions. The points within the dark gray region have a sufficiently high membership value in S while the points within the light gray region have a sufficiently low membership value. The shortest path between the two points x and y is contained within the light gray region and is not a straight-line segment.

The present invention provides theory and algorithms for fuzzy distance transforms (FDT), representing an extension of the concept of distance transforms for hard objects to the more common fuzzy objects present in imaging. The section entitled Theory describes the theory and properties of FDT in both continuous and digital cubic spaces, and further describes the metric property of fuzzy distance. The section entitled Algorithm describes a dynamic programming-based algorithm for computing FDT of digital objects. The termination of the algorithm in a finite number of steps, as well as its correctness are thus established. The results of applications of the FDT method are presented in the Examples.

It has been shown that fuzzy distance is a metric for the interior of the support of a fuzzy object. A salient feature of fuzzy objects is the property that the shortest path between two points is no longer a straight-line. It has also been shown that the raster scan algorithm commonly used for distance transforms of hard objects fails in the case of fuzzy objects. A dynamic programming-based algorithm is presented in the invention for computing FDT of fuzzy digital objects. It has been shown that the algorithm terminates in a finite number of steps and when it does so, it correctly computes FDT. Finally, several potential applications for fuzzy distance transforms in medical imaging are presented, including the quantification of the thickness of vascular structures and of trabecular bone to voxel size, object rotations, and signal-to-noise ratios (SNR). In addition, reproducibility of the methods was assessed in specimen and in vivo studies in humans, and changes in trabecular thickness were evaluated in response to specific drug treatment.

Theory

In this section, the theory is presented and the properties of fuzzy distance transform of fuzzy subsets are defined either in the continuous space or in a digital space. First described is the case for the continuous space, which will then guide the formulation in a digital space.

1. FDT in Continuous Space

Let $\mathfrak{R}^n$ denote the n-dimensional continuous space. A "fuzzy subset" (see, e.g., Kaufmann, 1975) S of $\mathfrak{R}^n$ is defined as a set of pairs $\{(x, \mu_s(x)) | x \in \mathfrak{R}^n\}$ where $\mu_s: \mathfrak{R}^n \to [0, 1]$ is the "membership function" of S in $\mathfrak{R}^n$. For any value $\theta \in [0, 1]$, "$\theta$-support" of S, denoted by $\Theta_\theta(S)$, is the hard subset $\{x | x \in \mathfrak{R}^n\}$ and $\mu_s(x) \geq \theta\}$ of $\mathfrak{R}^n$. In other words, the $\theta$-support of S is the set of all points in $\mathfrak{R}^n$ with membership values greater than or equal to $\theta$. 0-support will often be referred to as "support" and be denoted by $\Theta(S)$. A fuzzy subset with a bounded support is called "bounded."

The following notions on fuzzy subsets are used herein, (see, Rosenfeld, *Fuzzy Sets Systems* 13:241-246 (1984); Bogomolny, *Fuzzy Sets Systems* 23:257-269 (1987) for details). A fuzzy subset S is a "ring" if $\mu_s = \tilde{\mu}(r)$, where $r = \|x - x_0\|$ for some $x_0 \in \mathfrak{R}^n$ and $\tilde{\mu}: \mathfrak{R} \to [0, 1]$ is a membership function. S is said to be "convex" if, for every three collinear points x, y, and z in $\mathfrak{R}^n$ such that y lies between x and z, $\mu_s(y) \geq \min[\mu_s(x), \mu_s(z)]$. A convex ring is called a "fuzzy disk." A fuzzy subset is called "smooth" if it is differentiable at every location $x \in \mathfrak{R}^n$.

Let S be a (hard) subset of $\mathfrak{R}^n$. $\bar{S}$ is used to denote its complement, while "Interior (S)" denotes its interior, which is the largest open set contained in S. The distance transform (DT) of S may be represented as an image $\{(x, D_S(x)) | x \in \mathfrak{R}^n\}$ on $\mathfrak{R}^n$ where $D_s$ is the DT value at x that is defined as follows.

$$D_S(x) = \inf\{\|x-y\| | y \in \bar{S}\} \quad \text{(Equation 1)}$$

where, inf gives the infimum of a set of positive numbers and $\|\cdot\|$ is the Euclidean norm.

In the above equation, S should be a proper subset of $\mathfrak{R}^n$. In digital images, bounded objects are always used so that $\bar{S}$ is always nonempty. In the subsequent discussions, the fuzzy distance transform is considered of only bounded subsets.

Here, FDT of a fuzzy subset S is defined in $\mathfrak{R}^n$. Similar to ordinary DT, FDT is an image on $\mathfrak{R}^n$. The FDT image is denoted by a set of pairs $\{(x, \Omega_S(x)) | x \in \mathfrak{R}^n\}$, where $\Omega_S(x)$ is the FDT value at x which is defined in the following way.

A "path" $\pi$ in $\mathfrak{R}^n$ from a point $x \in \mathfrak{R}^n$ to another point (not necessarily distinct) $y \in \mathfrak{R}^n$ is a continuous function $\pi: [0, 1] \to \mathfrak{R}^n$, such that $\pi(0) = x$ and $\pi(1) = y$. The "length" of a path $\pi$ in S, denoted by $\Pi_S(\pi)$, is the value of the following integration $$\Pi_S(\pi) = \int_0^1 \mu_S(\pi(t)) \left| \frac{d\pi(t)}{dt} \right| dt \quad \text{(Equation 2)}$$

Following the above equation, $\Pi_S(\pi)$ is the integral of membership values (in S) along $\pi$. Note that, if the inverse path is defined as $\pi'(t) = \pi(1-t)$ of $\pi$, it can be shown that $\Pi_S(\pi) = \Pi_S(\pi')$. A question arises at this point on weighting the path length using membership values. Although other membership-based weights, e.g., absolute derivatives, may be useful in some applications, membership values themselves are used herein as weights as it is intended that the distance between two points is defined as the minimum material that has to be traversed to proceed from one point to the other. Thus, when a path passes through a low density (low membership) region, its length increases slowly and the portion of the path in the complement of the support of S contributes no length. This approach is useful to measure regional object depth, object thickness distribution, etc.

In some applications, it may be useful to consider lengths of connected paths (paths entirely contained in $\Theta(S)$) only. This can be conceived by incorporating a little change in the definition of path length as follows:

$$\Pi'_S(\pi) = \int_0^1 \mu'_S(\pi(t)) \left| \frac{d\pi(t)}{dt} \right| dt \quad \text{(Equation 3)}$$

where $$\mu'_S(x) = \begin{cases} \mu_S(x), & \text{if } \mu_S(x) > 0, \\ \infty, & \text{otherwise.} \end{cases} \quad \text{(Equation 4)}$$

It can be shown that both $\Pi_S$ and $\Pi'_S$ lead to identical FDT images and Theorems 1 and 2 (see below), which originally proved $\Pi_S$, are also true for $\Pi'_s$. $\Pi_S$ is used herein to define fuzzy distance.

The set of all paths from a point $x \in \mathfrak{R}^n$ to another point $y \in \mathfrak{R}^n$ is denoted by $\mathcal{P}(x, y)$. It may be noted that $\mathcal{P}(x, y)$ contains infinitely many paths. The shortest path from $x \in \mathfrak{R}^n$ to $y \in \mathfrak{R}^n$ in S is a path $\pi_{x,y} \in \mathcal{P}(x, y)$ such that $\Pi_S(\pi_{x,y}) \leq \Pi_S(\pi), \forall \pi \in \mathcal{P}(x, y)$. It is worth mentioning that there may or may not be only one shortest path between two points in a fuzzy subset, and when it does exist, it may not be unique.

The following is a 2D example where no shortest path exists between two points. Consider a fuzzy subset of $\mathfrak{R}^2$ with its support as a disk and let us pick any two points x and y near its center. Within the support of the fuzzy subset, there are only two membership values—a high membership value for the points on the straight-line segment joining x and y, and a low membership value elsewhere. It is not difficult to see that the straight-line segment $\overline{xy}$ is not the shortest path between x and y and for any other path $\pi$ between the two points it is possible to find a shorter path by further straightening the path. Although the existence of one shortest path between two points in a fuzzy subset is not guaranteed, the infimum of path lengths always exists and is unique.

Let $\xi_S(x, y)$ denote a subset of positive real numbers defined as $\xi_S(x, y) = \{\Pi_S(\pi) | \pi \in \mathcal{P}(x, y)\}$; i.e., $\xi_S(x, y)$ is the set of all possible path lengths in S between x and y. The "fuzzy distance" from $x \in \mathfrak{R}^n$ to $y \in \mathfrak{R}^n$ in S, denoted as $\omega_S(x, y)$, is the infimum of $\xi(x, y)$; i.e., $$\omega_S(x, y) = \inf \xi_S(x, y) \quad \text{(Equation 5)}$$

Fuzzy distance satisfies metric properties as stated in the following theorems (see proofs, Saha et al., *Computer Vision and Image Understanding* 86:171-190 (2002)).

THEOREM 1. For any fuzzy subset S of $\Re^n$ for any non-zero positive number $\theta<1$ fuzzy distance $\omega_S$ is a metric for Interior($\Theta_\theta(S)$).

THEOREM 2. For any smooth fuzzy subset S of $\Re^n$, fuzzy distance $\omega_S$ is a metric for Interior($\Theta_\theta(S)$).

Interestingly, the shortest paths (when they exist) in a fuzzy subset S between two points x, y $\in \Re$ are not necessarily a straight-line segment, even when S is convex. For example, consider the fuzzy disk S illustrated in FIG. 1. In the figure, the support $\Theta S$ of the fuzzy disk is the shaded region. In this example, within the support $\Theta S$, there are two possible membership values—points with high membership value are shown as dark gray and those with low membership value (within the outer annular region) are shown as light gray. Consider the two points x and y as illustrated in the figure. Assuming the high membership value is sufficiently close to one and the low one close to zero, the shortest path between x, y should be contained within the light gray region, and therefore is not a straight-line segment.

Maintaining the same spirit as in the distance transform of hard sets, the FDT value $\Omega_S(x)$ at a point x $\in \Re^n$ is equal to the fuzzy distance between x and the closest (with respect to $\omega_S$) point in $\overline{\Theta(S)}$. In other words, the value of value $\Omega_s(x)$ is defined as follows $$\Omega_S(x) = \inf\{\omega_S(x, y) | y \in \overline{\Theta(S)}\}. \quad \text{(Equation 6)}$$

2. FDT in Digital Cubic Spaces

Fuzzy distance transformation are next described in digital cubic spaces guided by the formulation of the same in the continuous space $\Re^n$ as discussed in the previous section. To make the description more precise, the concepts are redefined in digital spaces corresponding to the previous definitions in the continuous space. In order to avoid unnecessary heaping of notations, the same notations are used in this section as were used in Section 1, although their exact meaning in a digital space may be different from that of the continuous space.

A "digital space" D is an ordered pair (G, $\alpha$), where G is the underlying digital grid and $\alpha$ is a binary relation on G that indicates the adjacency relationship between every two points in G. In general, a "digital grid" is a set of points in $\Re^n$, such that the interpoint distances are bounded below, and within a bounded distance of any point in $\Re^n$ there is at least one point in the grid. However, most imaging systems acquire images in cubic grids, and these grids are simple to describe as well as to understand. Therefore, the following description is made in terms of cubic grids. An n-dimensional cubic grid may be constructed by dividing $\Re^n$ into hypercuboids with n orthogonal families, each of equally spaced parallel hyperplanes. The set of the centers of these hypercuboids generates a cubic grid, and it is not difficult to see that, under a proper coordinate system, these points represent the points in $Z^n$ where Z is the set of all integers. $Z^n$ is used to represent an n-dimensional cubic grid. The notion of adjacency is useful to define a path in a digital space and the boundary of a digital object.

Although researchers have used fuzzy adjacencies (Rosenfeld, *Pattern Recog. Lett.* 2:311-317 (1991); Udupa et al., *Graphical Models Image Process.* 58:246-261 (1996)), the interpretation of fuzziness of adjacencies in the context of a path is not clear. Therefore, the description is confined to hard adjacencies only. In other words, $\alpha: Z^n \times Z^n \to \{0\ 1\}$. Two points p, q $\in Z^n$ are called "adjacent" if, and only if $\alpha(p, q)=1$.

In the rest of this paper, $\alpha$ can be standard 4- or 8-adjacency in 2D, 6-, 18-, or 26-adjacency in 3D, and their higher dimensional analogs.

Two adjacent points are often referred to as "neighboring" points to each other.

A "digital object" "O" is a fuzzy subset $\{(p, \mu_O(p)) | p \in Z^n\}$, where $\mu_O: Z^n \to [0, 1]$ specifies the membership value at each point in the object. It should be noted that, in general, an imaging system (Cho et al., *Foundations of Medical Imaging*, Wiley, New York, 1993) acquires images containing information of a target object, often along with other co-objects. However, following the spirit of the problem addressed here, digital objects are defined instead of digital images (Rosenfeld et al., in *Digital Picture Processing*, 2nd ed., Vol. 2, Academic Press, New York, 1982). In other words, the proposed framework assumes that the target object is already (fuzzily) segmented from an acquired digital image using an appropriate segmentation method (Rosenfeld et al., 1982, Pal et al., *Pattern Recog.* 26:1277-1294 (1993); Udupa et al., (eds.), *3D Imaging in Medicine*, CRC Press, Boca Raton, Fla., 1991; Sonka et al., *Image Processing, Analysis, and Machine Vision*, 2nd ed., PWS Publishing, Brooks/Cole, Pacific Grove, Calif., 1999; Kong et al., *Topology Appl.* 46:219-262 (1992)). This process of extracting an object from an image, commonly referred to as image segmentation, has been studied extensively for decades. Since the subject itself is an open area of research, rather than becoming involved with that issue, the present invention is described assuming the above definition of a digital object.

The support $\Theta(O)$ of a digital object O is the set of all points in $Z^n$ each having a nonzero object membership value, i.e., $\Theta(O) = \{p | p \in Z^n \text{ and } \mu_O(p) \neq 0\}$. A "path" $\pi$ in a set S of points from a point p $\in$ S to another (not necessarily distinct) point q $\in$ S is a sequence of points $p=p_1, p_2, \ldots, p=q$, such that $p_i \in$ S for all $1 \leq i \leq m$ and $p_j$ is adjacent to $p_{j+1}$ for all $1 \leq j \leq m$. The length of the path is m.

Although only hard adjacency relations are considered to define a path, the Euclidean distance between two adjacent points should be used in a meaningful way in defining its length. A set of points S will be called "path connected" if, and only if, for every two points, p, q $\in$ S, there is a path in S from p to q. $\mathcal{P}(p, q)$ will denote the set of all paths in $Z^n$ from a point p $\in Z^n$ to another point q $\in Z^n$. For the purpose of defining the length of a path, the notion of a link and its length is used. A "link" is a path consisting of two points. The length of a link $\langle p, q \rangle$ in O maybe defined in different ways, e.g., (1) $\max\{\mu_O(p)\mu_O(q)\} \times \|p-q\|$, (2) $\frac{1}{2}(\mu_O(p)+\mu_O(q)) \times \|p-q\|$, etc. Notably, in both examples, the length of a link has two components—one coming from the membership values at p and at q, and the other from the distance between the two points. In the disclosed embodiment of the invention, the second choice is followed for the length of a link. Theoretical requirements for a valid length function for links are (1) the length of a link $\langle p, p \rangle$ is "0," (2) the length of the links $\langle p, q \rangle$ and $\langle q, p \rangle | p, q \in Z^n$ are equal, and (3) the length of a link $\langle p, q \rangle$, where p $\in \Theta(O)$ and p$\neq$q, is greater than zero. The "length" $\Pi_O(\pi)$ of a path $\pi = \langle p=p_1, p_2, \ldots, p_m=q \rangle$ is the sum of the lengths of all links on the path, i.e., $$\Pi_O(\pi) = \sum_{i=1}^{m-1} \frac{1}{2}(\mu_O(p_i) + \mu_O(p_{i+1})) \times \|p_i - p_{i+1}\|. \quad \text{(Equation 7)}$$

$\pi_{p,q} \in \mathcal{P}(p,q)$ is one "shortest path" from $p \in Z^n$ to $q \in Z^n$ in O if $\Pi_O(\pi_{p,q}) \leq \Pi_O(\pi)$, $\forall \pi \in \mathcal{P}(p,q)$. Unlike the case of the continuous case, one shortest path always exists between two points in a bounded digital fuzzy object.

PROPOSITION 1. For any digital space $D=(Z^n, \alpha)$ for any fuzzy object O on D with a bounded support, for any two points $p, q \in Z^n$, there exists one shortest path from p to q.

Proof. Consider a path $\pi = \langle (p_1, p_2, \ldots, p_i, p_{i1}, p_{i2}, \ldots, p_{i1}, p_i, p_{i+1}, \ldots, p_m \rangle$ with a repetition at $p_i$, forming a loop (a path with the common starting and finishing point). Obviously, the length of the path $\langle p_1, p_2, \ldots, p_i, p_{i+1}, \ldots, p_m \rangle$ obtained by removing the repetition, is less than or equal to that of $\pi$. Therefore, to prove this proposition it is shown that among the paths without any repetition, there is one with the smallest length. Since the support of O is bounded, there are only finitely many links with nonzero values, and therefore, there are finitely many length values for the paths without any repetition. Hence, there is the minimum length for the paths between p and q and a path with the minimum length is one shortest path.

Although, the existence of one shortest path is guaranteed in fuzzy digital objects, as in the continuous space, there may be multiple shortest paths between two points in a fuzzy digital object between two points. In the rest of this disclosure, fuzzy digital objects with bounded supports are considered. The fuzzy distance, from $p \in Z^n$ to $q \in Z^n$ in O, denoted as $\omega_O(p, q)$, is the length of any shortest path in O from p to q. Therefore, $$\omega_O(p, q) = \min_{\pi \in P(p,q)} \Pi_O(\pi) \qquad \text{(Equation 8)}$$

Moreover, it is shown that, similar to the case of fuzzy subsets in the continuous space, fuzzy distance in a digital object defined over a digital cubic space is a metric.

THEOREM 3. For any digital cubic space $D=(Z^n, \alpha)$ for any digital object O, fuzzy distance $\omega_O$ is a metric for $\Theta(O)$.

For proof of Theorem 3, see Saha et al., 2002.

Following the framework of FDT for fuzzy subsets in the continuous space, the FDT value at a point $p \in Z^n$ in a fuzzy object O over a digital space, denoted by $\Omega_o(p)$, is equal to the fuzzy distance between p and the nearest point in $\overline{\Theta(O)}$. In other words, the value of $\Omega_o(p)$, is defined as follows:

$$\Omega_O(p) = \min_{q \in \overline{\Theta(O)}} \omega_O(p, q) \qquad \text{(Equation 9)}$$

Algorithms

In this section, an algorithm embodiment is presented for computing the FDT of digital objects. Also, a proof will be provided that the algorithm terminates in a finite number of steps, and when it does so it outputs the FDT of the digital object. Assuming a uniform neighborhood, we can think that, with respect to a point $p \in Z^n$, all its adjacent neighbors are ranked. A vector $\delta$, called a "resolution vector," is used whose ith element gives the continuous distance between a point and its ith adjacent neighbor. This uses the $(3^n-1)$-adjacency relation (i.e., 8-adjacency in 2D and 26-adjacency in 3D). Therefore, $\delta$ is a $(3^n-1)$-dimensional vector. The information about the resolution vector may be directly obtained from the application imaging system. Let $N^*(p)$ denote the set of adjacent neighbors of a point $p \in Z^n$ excluding p itself.

Figure 2:
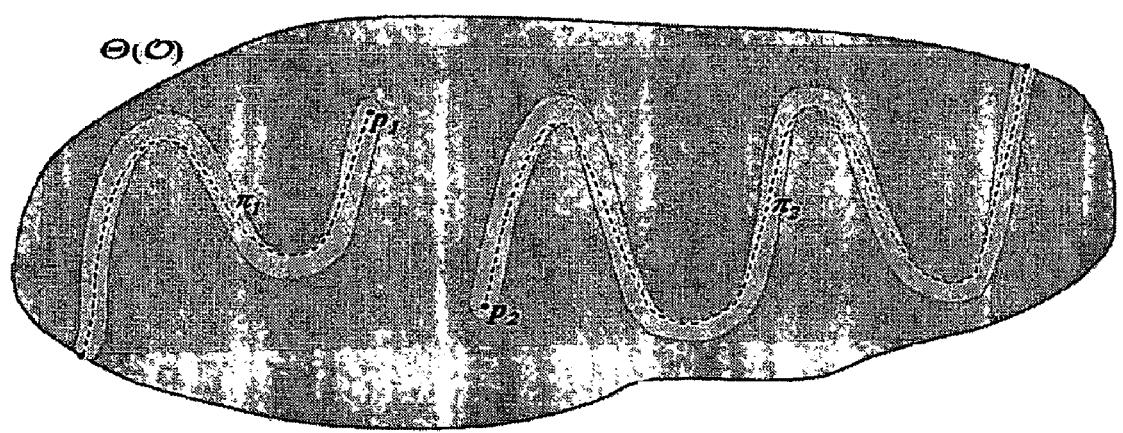
FIG. 2 depicts an example demonstrating why a raster scan based approach fails to compute FDT for fuzzy digital objects in a fixed number of scans. The support $\Theta(O)$ of the fuzzy object O is the union of different shaded regions. The dark (light) gray region resembles the set of points with sufficiently high (respectively, low) membership values in O. The path $\pi_1$ ($\pi_2$) is the shortest path in O from $p_1$ (respectively, $p_2$) to the complement of $\Theta(O)$. Computation of the length of $\pi_1$ ($\pi_2$), i.e., the FDT value at $p_1$ (respectively, $p_2$) in O, needs three (respectively, five) raster scans.
Figure 7:
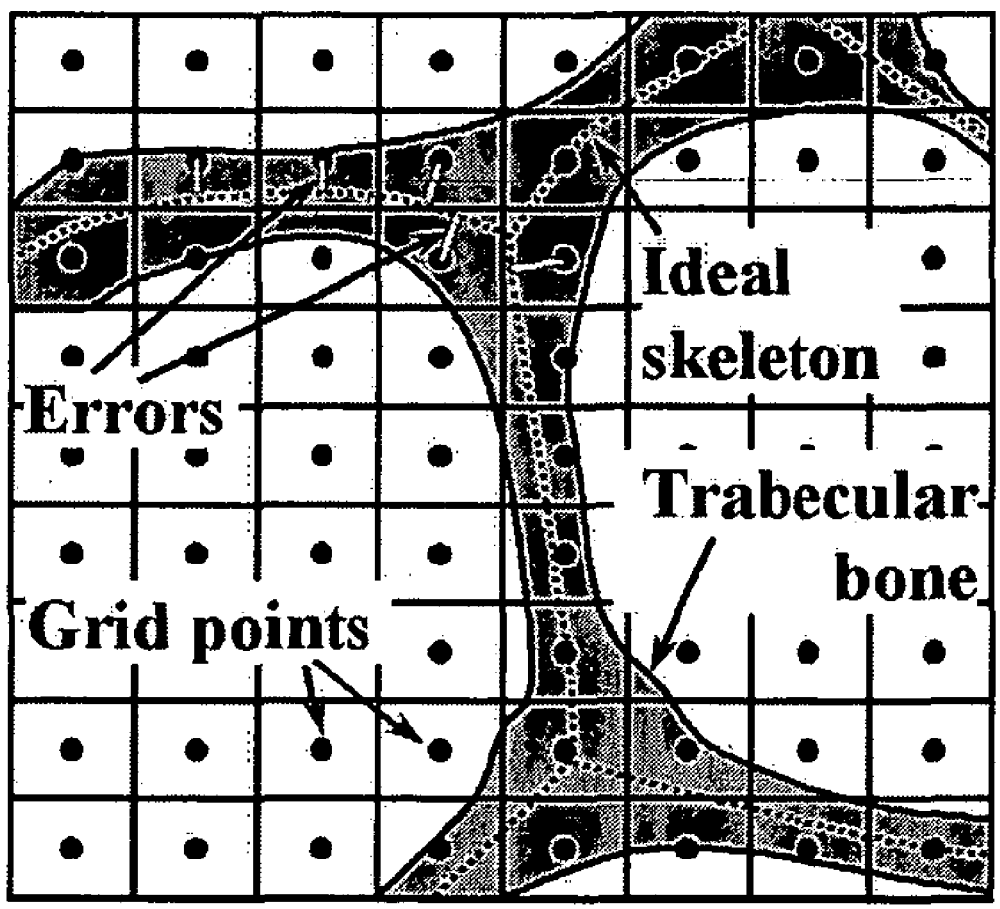
FIG. 7 is a graphic illustration to demonstrate how digitization introduces a resolution-dependent systematic negative error in FDT-based average thickness computation. The shaded object region represents a cross section of trabecular bone over a small region. The ideal skeleton of these trabeculae is indicated by the dotted lines, and the true thickness would be obtained if FDT values could be sampled along the actual skeleton. However, since a digital skeleton is a set of grid points close to the ideal skeleton, thickness distribution is computed by sampling FDT values at these grid points only, which introduces a random negative error (small white bars).
Figure 8:
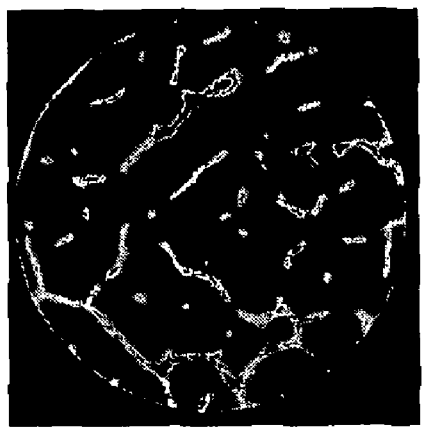
FIGS. 8(a)-8(d) depict image sets.
Figure 8:
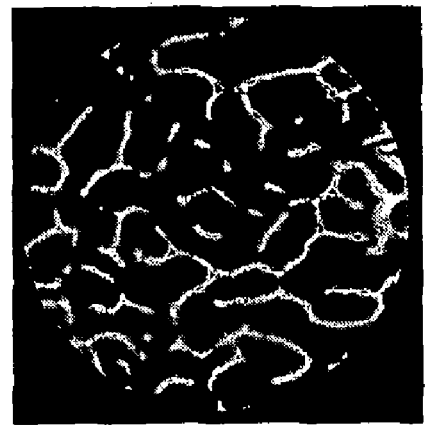
Figure 8:
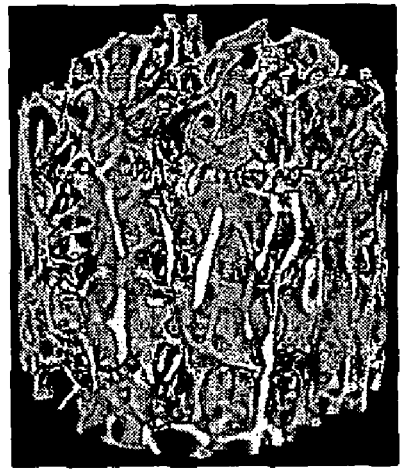
Figure 8:
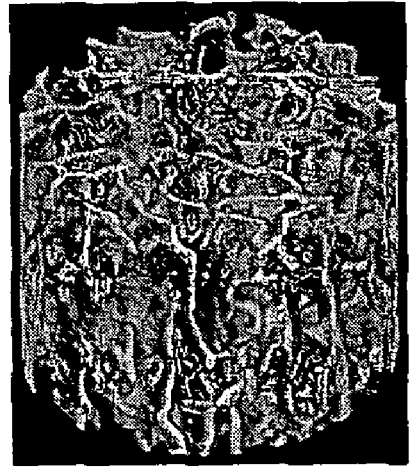

As demonstrated by Borgefors in 1996, a raster scan approach effectively computes regular DT for binary images using only two scans. A basic reason behind this is the fact that in a binary image the shortest path from a point to the background (the complement of the binary object) is always a straight-line segment (in a digital sense). However, this is not true for fuzzy digital objects (see FIG. 8). This makes a raster scan based approach inappropriate in computing FDT, as illustrated by example in FIG. 8. Similar to the example shown in FIG. 7, in FIG. 8, dark gray indicates high membership in the object O and light gray indicates low membership. Consider two points $p_1$ and $p_2$ as shown in the figure. Let $\pi_1$ be a shortest path from $p_1$ to $\overline{\Theta(O)}$, and let $\pi_2$ be the same, but from $p_2$. It is not difficult to see that three raster scans are needed to compute the length of $\pi_1$ in O (i.e., the FDT value at $p_1$), while it takes five scans to do so for $\pi_2$ (i.e., the FDT value at $p_2$). Therefore, the number of raster scans needed to compute the FDT of a fuzzy object is dependent on the shape of the object as demonstrated in FIG. 2. The iterative algorithm (Rosenfeld et al., 1982) for computing the distance transform of a hard digital object can be used to compute FDT of fuzzy objects. However, such approaches will be inefficient in this application as the shortest path from a point to the background may be quite complicated, and for each iteration the method needs to scan the entire image.

In the following section, a dynamic programming-based algorithm is presented to compute FDT of a fuzzy digital object.

---

ALGORITHM. Compute_FDT.

Input: $O = (Z^n, \mu_O)$, $\alpha$, and $\delta$, as defined above.

Auxiliary Data Structures: modified fuzzy object $O = (Z^n, \mu_O)$, an image $(Z^n, \Omega)$ representing FDT of O, and a queue Q of points.

Output: an image $(Z^n, \Omega)$ representing FDT of O.

1. input $O = (Z^n, \mu_O)$;
2. for all $p \in \overline{\Theta(O)}$, set $\Omega(p) = 0$;
3. for all $p \in \Theta(O)$, set $\Omega(p) = MAX$;
   /* MAX is a large value */
4. for all $p \in \Theta(O)$, such that $N^*(p) \cap \overline{\Theta(O)}$ is non-empty
5.    push p into Q;
6. while Q is not empty do
7.    remove a point p from Q;
8.    find $dist_{min} = \min_{q \in N^*(P)} [\Omega(q) + \delta_{rank(p,q)} \times \frac{1}{2}(\mu_O(p) + \mu_O(q))]$;
      /* rank(p, q) gives the rank of q in the neighborhood of p*/

```
 9.     find dist_min < Ω(p) then
10.         set Ω(p) = dist_min;
11.         push all points q ∈ N*(p) ∩ Θ(O) into Q;
12. output the FDT image O
```

In the following two propositions, it is proven that the embodied algorithm compute_FDT terminates in a finite number of steps, and when it does so, it produces the FDT image.

PROPOSITION 3.1. For any fuzzy object $O=(Z^n, \mu_O)$ over any digital cubic space $(Z^n, \alpha)$, the algorithm compute_FDT terminates in a finite number of steps.

Proof. The algorithm is iterative, and at each iteration in the while-do loop, it removes exactly one point from queue Q. Also, only the points of $\Theta(O)$ visit Q. Since the number of elements in $\Theta(O)$ is always finite, the algorithm compute_FDT fails to terminate in a finite number of steps only when some point $p \in \Theta(O)$ is modified infinitely many times. Following Steps 9 and 10, the value at p strictly decreases after every modification. Moreover, following Steps 8, 9, and 10, during every modification, p is assigned the value of the length of some path in O from p to a point in $\overline{\Theta(O)}$. First, it is shown that p is always set to $\Pi_O(\pi)$ for some $\pi$ without any repetition or loop. If this is not true, without loss of generality, let p be the first point to break the rule. Therefore, the path $\pi$ is of the form $q_1, q_2, \ldots, p, \ldots, p$. But, this is possible only when p has previously been assigned the length of the path $\pi'=q_1, q_2, \ldots, p$. Following Equation 7, it is obvious that $\Pi_O(\pi') \leq \Pi_O(\pi)$. But this contradicts Step 9. Now, since $\Theta(O)$ is finite, there are only finitely many length values for repetition-free paths from $\overline{\Theta(O)}$ to p. Hence, any point $p \in Z^n$ could be modified only finitely many times. Hence compute_FDT terminates in a finite number of steps.

To prove the correctness of the algorithm the following notation is needed. Let $$T_{p,\overline{\Theta(O)}}(l)$$

denote the set of all paths of less than or equal to l points from p to some $q \in \overline{\Theta(O)}$.

PROPOSITION 2. For any fuzzy object $O=(Z^n, \mu_O)$ over any digital cubic space $(Z^n, \alpha)$, when the algorithm compute_FDT terminates, its output equals the FDT image $(Z^n, \Omega_O)$.

Proof. Initially, the algorithm starts with the points of $\overline{\Theta(O)}$ (see Steps 2-4). Thus, Steps 8-10 guarantee that whenever a point p is set to $dist_{min}$ (in Step 10), there is always a path from some $q \in \overline{\Theta(O)}$ to p with length $dist_{min}$. Therefore, for any $p \in Z^n$, $\Omega(p) \geq \Omega_O(p)$.

It may be observed from the algorithm that it never increases the value of any $p \in Z^n$. It is now proven that, for any $p \in Z^n$, $\Omega_O(p) \geq \Omega(p)$ by using the method of induction. Obviously, for any $p \in Z^n$, $$T_{p,\overline{\Theta(O)}}(1)$$

is nonempty implies that $p \in \overline{\Theta(O)}$, and following Equation 7, the length of any element of $$T_{p,\overline{\Theta(O)}}(1)$$

is always "0." Thus, in Step 2, it is guaranteed that the algorithm sets every point $p \in Z^n$ to the length of the shortest path of $$T_{p,\overline{\Theta(O)}}(1)$$

in O. Now assume that the algorithm sets every point $p \in \Theta(O)$ to the length of the shortest path of $$T_{p,\overline{\Theta(O)}}(i-1),$$

for some i>1, in O. It is shown that the algorithm sets every point $p \in Z^n$ to the length of the shortest path of $$T_{p,\overline{\Theta(O)}}(i)$$

in O in Steps 7-11. Let $\pi_p = \langle q=p_1, p_2, \ldots, p_i=p \rangle$ be the shortest in O among all paths of $$T_{p,\overline{\Theta(O)}}(i)$$

from a point $q \in \overline{\Theta(O)}$ to p. Following the hypothesis of the induction method, at a certain iteration the algorithm sets the point $$p_{i-1} \text{ to } \Omega(p_{i-1}) = \min_{\pi \in T_{p_{i-1},\overline{\Theta(O)}}(i-1)} \Pi_O(\pi) \leq \Pi_O(\langle p_1, p_2, \ldots, p_{i-1} \rangle)$$

at Step 10, and Step 11 ensures that, in the same iteration, p is pushed into Q; and upon the removal of p from Q, it is assigned (see Steps 7 to 10) a value less than or equal to $\Omega(p) = \Omega(p_{i-1}) + \delta_{rank(p_i,p_{i-1})} \times \frac{1}{2}(\mu_O(p_i) + \mu_O(p_{i-1})) \leq \Pi_O(\pi_p)$ (following Equation 7); note that $\delta_{rank(p_i,p_{i-1})} = \|p_i - p_{i-1}\|$. Therefore, for any $p \in Z^n$, $\Omega_O(p) \geq \Omega_O(p)$. Hence, by the results in the previous paragraph, for any $p \in Z^n$, $\Omega_O(p) = \Omega_O(p)$.

FDT-Based Thickness Computation

Thickness is a useful parameter in analyzing object shape and morphology, and as shown above, FDT provides the depth mapping at each point within the support of a fuzzy object O. The principle of FDT-based thickness computation is to sample these depth values along the medial axis (or medial surface) of target O; thus, providing the regional thickness distribution over the object. "Skeletonization" is a widely used technique to generate the medial surface representation of a digital object (Srihari et al., 1979; Tsao et al., 1981; Saha et al., 1997). This is accomplished by reducing a 3D object into a union of surfaces and curves (some investigators have further reduced it to a union of curves only (Pothuaud et al., *J. Microsc.* 199:149-161 (2000))), thereby preserving the topology and shape of the original object.

Although, topology preservation of digital objects has a generally accepted definition, the same is not true for shape, and different researchers often use different definitions. The inventors' previously described method (Saha et al., *Pattern Recognition* 30:1939-1955 (1997)) has been used in the present work for skeletonization. The method iteratively erodes an object along its border while preserving its topology and retaining the surfaces and curves necessary to describe the shape of the object. Each iteration consists of three complete scans of the entire image space, and in each scan there are different types of border points (referred to as "s-open," "e-open," and "v-open" points). The simple point characterization, (see also, Saha et al., *IEEE Transactions on Pattern Analysis and Machine Intelligence* 16:1028-1032 (1994)) was used for topology preservation, i.e., only simple points were deleted during erosion. Thus, efficient computational approaches were implemented.

To preserve object shape, edge points of surfaces and end points of curves were saved during erosion. Thus, both types of points are referred to as "shape points." The skeletonization process takes 45-60 seconds for a 3D trabecular bone image set of 256×256×60 image size on a 450 MHz Pentium III PC running under Linux OS. The robustness of the skeletonization method under rotation and noise was previously demonstrated (Saha et al., 1997). After calculating the skeleton of the support of trabecular bone, the distribution of regional thickness over O was computed in accordance with the present invention by sampling the FDT values along the skeleton. Following the same theory, thickness is computed along the skeleton of an object.

While it may be desirable to generate the skeleton of an object directly from its fuzzy representation by taking into account the bone volume fraction value at each location, the significant research and developmental demands needed are beyond the scope of the present invention. Therefore, instead, the standard skeleton on the support E)(O) of object O is used to obtain its medial axis representation and compute its thickness. It should be noted that no explicit threshold is required to define the support $\Theta(O)$, and therefore, the resulting skeleton is not threshold sensitive.

Let denote the skeleton $Sk(\Theta(O))$ of $\Theta(O)$. The mean thickness of an object denoted by $\tau(O)$, is computed as the average of twice (2×) the FDT values along the skeleton of $Sk(\Theta(O))$, i.e., $$\tau(O) = \frac{\sum_{p \in Sk(\Theta(O))} 2\Omega_O(p)}{|Sk(\Theta(O))|} \quad \text{(Equation 10)}$$

where $|Sk(\Theta(O))|$, yields the number of points in the skeleton.

As demonstrated above, the FDT approach deals effectively with partial volume effects. However, digitization introduces a resolution-dependent, systematic error in the FDT-based thickness computation, as illustrated in FIG. 1. Consequently, the present invention further provides an approximate solution that corrects for these digitization errors. As described in the previous paragraph, the true thickness can be obtained by sampling the FDT values along the ideal medial axis of a structure. Obviously, any deviation from this ideal medial axis can only reduce the estimated value of thickness. See, FIG. 1, wherein the ideal skeleton of the shaded object region is shown by the dotted lines, and the true thickness would be obtained if FDT values could be sampled along these dotted lines. However, in most digital image processing approaches, object representations, as well as related computations, are confined to grid points. Following this basic limitation, a digital skeleton is a set of grid points close to the ideal skeleton. Thus, FDT values are sampled only at grid points close to the ideal skeleton, thereby introducing a random negative error in computed thickness as illustrated in the figure.

For a given voxel size, these errors have an upper bound, which is the maximum of the shortest distance between the ideal skeleton and a grid point. Obviously, this upper bound equals half of the voxel's diagonal. For an isotropic structure, assuming that the true skeleton can pass through any point within the voxel with a uniform probability, the expected average error should be the value of the following integral:

$$\text{error} = \frac{1}{\rho^3} \int_{\frac{\rho}{2}}^{\frac{\rho}{2}} \int_{\frac{\rho}{2}}^{\frac{\rho}{2}} \int_{\frac{\rho}{2}}^{\frac{\rho}{2}} \sqrt{x^2 + y^2 + z^2} \, dx \, dy \, dz \quad \text{(Equation 11)}$$

where "$\rho$" is the voxel resolution. In the case of highly anisotropic bone, such as in the case of the distal radius, where the trabeculae are predominantly oriented along the z direction, the third dimension can be ignored. Using numerical approaches (see, e.g., Press et al., *Numerical Recipies: The Art of Scientific Computing*, Cambridge, London: Cambridge University Press, 1986), the value of the above integration in the xy plane approximates to error=0.38 $\rho$ Finally, an in-plane resolution-dependent correction was added to the average FDT-derived thickness values to obtain final thickness, as follows:

$$\tau_c(O) = \frac{\sum_{p \in Sk(\Theta(O))} 2\Omega_O(p)}{|Sk(\Theta(O))|} + 0.38\rho \quad \text{(Equation 12)}$$

After execution of all preprocessing steps (BVF computation), the complete FDT based thickness computation method takes on the order of 1-1.5 minutes for typical 3D image data sets.

To validate the results of the present FDT-based method, its performance at different resolutions was compared with a previously reported 3D thickness computation method (the algorithm of Hildebrand et al., *J. Microscopy* 185:67-75 (1997)). The method estimates regional thickness of trabecular bone using binary distance transform and local maxima ("center points of all nonredundant spheres") in thresholded images. For all resolutions, a threshold of 50% BVF was used. In addition, at the highest resolution (22 μm) thresholds were varied between 25 and 75% BVF.

To evaluate methods of the invention and to demonstrate the potential in longitudinal in vivo studies, experiments were conducted to evaluate, e.g., the sensitivity of the thickness computation method to voxel size, object rotations, and signal-to-noise ratios (SNR), respectively, as well as reproducibility, as assessed in specimen and in vivo studies in humans, including specific studies to confirm the value of the method for assessing the changes in trabecular thickness in response to corticosteroid drug treatment. The following illustrate a few examples of applications of FDT methods of the present invention, and describe a method of computing local thickness using FDT. However, these examples are not meant to limit the scope of the invention, and alternatives may be utilized.

EXAMPLES

The following experiments were all conducted in 3D, except the reproducibility study based on μ-CT data. For all experiments, the following steps were applied: (1) generation of a BVF map from the raw images, (2) FDT computation, (3) skeletonization, and (4) thickness computation. These steps for each experiment are described in the order in which they were executed.

Example 1

Application of FDT on a Fuzzy Image

Figure 3:
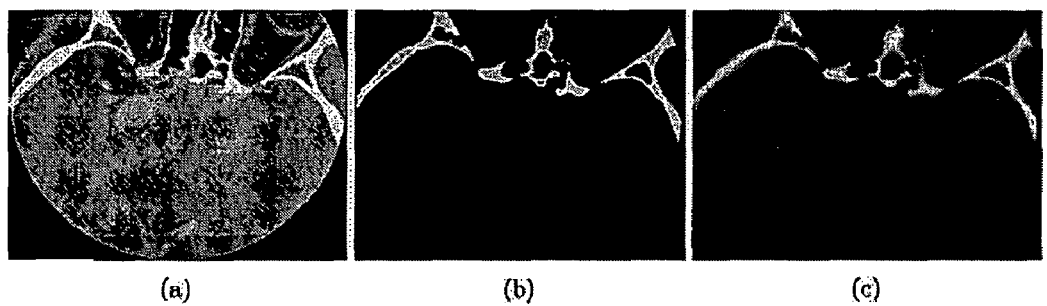
FIGS. 3(a)-3(c) depict the application of FDT on a fuzzy object.

The fuzzy object was constructed from a 2D slice of a 3D computed tomographic angiography (CTA) image of a patient's head. The original slice is shown in FIG. 3(a). The in-plane resolution of the image is 0.25×0.25 mm². A fuzzy object was generated as follows. The bone regions were segmented from the slice image through interactive thresholding. The fuzzy object representing the bone region was constructed by (1) blurring (to simulate partial volume effects) the thresholded image over a Gaussian kernel of radius 5 pixels, and (2) subsequently adding a correlated, zero-mean Gaussian noise with standard deviation equal to 10% of the pixel bone fraction value. The final fuzzy object is shown in FIG. 3(b).

The motivation behind the construction of the fuzzy object in this way is simply to demonstrate the results on a relatively realistic image. FIG. 3c shows the FDT image as derived from the fuzzy object of 3(b). In FIG. 3(c), the intensity values are shown to be proportional to its FDT value. As visually apparent in this figure, the ridges of FDT values follow the medial axis of the fuzzy object suggesting that there is potential for applications of FDT in computing skeletons of fuzzy objects.

Example 2

Computation of Thickness

To compute thickness in this experiment, the skeletonization method described in Saha et al., 1997, was used. Let $Sk(\Theta(O))$ denote the skeleton of $\Theta(O)$. At any point $p\epsilon Sk(\Theta(O))$, the thickness value was computed as twice the largest FDT value in the neighborhood of p.

Figure 4:
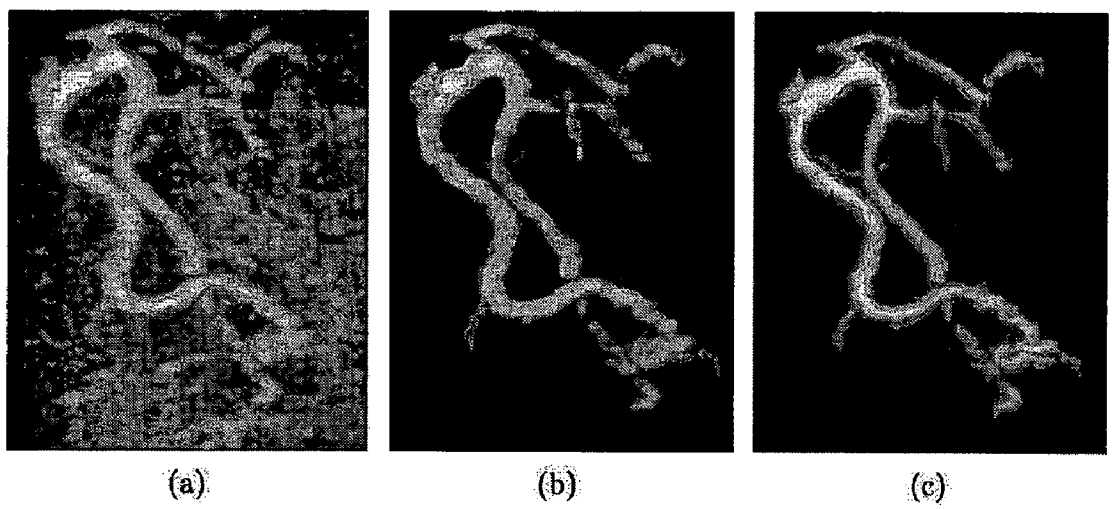
FIGS. 4(a)-4(c) depict application of FDT-based thickness computation to an arterial tree.

A first example of FDT-based thickness computation is illustrated in FIG. 4. FIG. 4(a) shows a maximum intensity projection (MIP) rendition of a portion of an arterial tree in a 3D CTA image of a subject's brain vasculature. The size of the image domain is 74×217×40 mm³ and the voxel size is 0.32×0.32×1.25 mm³. The image has been rendered after removing bone using a recently developed method (Saha et al., in Proc. SPIE: Med. Imag., San Diego, Calif., Vol. 4322, pp. 1264-1272 (2001)) from the inventors' laboratory. The mask for the arterial tree was segmented from the rest of the tissue using scale-based fuzzy connectedness (Saha et al., 2000). A membership value $\mu_A(p)$ at each location within the segmented artery mask was computed as: A.

$$\mu_O(p) = \begin{cases} G_{m_A \sigma_A}(f(p)), & \text{if } f(p) \le m_A \\ 1, & \text{otherwise,} \end{cases} \quad \text{(Equation 13)}$$

where $f$ is the image intensity function, $m_A$ and $\sigma_A$ are mean and standard deviations of intensity values within the arterial mask and $G_{m_A,\sigma_A}$ is an unnormalized Gaussian function with $m_A$ and $\sigma_A$ as its mean and standard deviation parameters. A zero membership value is assigned at each location outside the artery mask. A MIP rendition of the membership image of the arterial tree is presented in FIG. 4(b). The FDT image was computed for the 3D membership image of the arterial tree and the MIP rendition of the FDT image is illustrated in FIG. 4(c). In order to compute thickness, a curve skeleton of the arterial tree was computed using the method in Saha et al., 2000). The mean and the standard deviation of thickness (vessel diameter) values along the skeleton were 2.74 mm and 1.8 mm, respectively. Arterial plaques can be detected by identifying sudden reduction of vessel diameter while tracing along the curve skeleton of an arterial tree.

Figure 5:
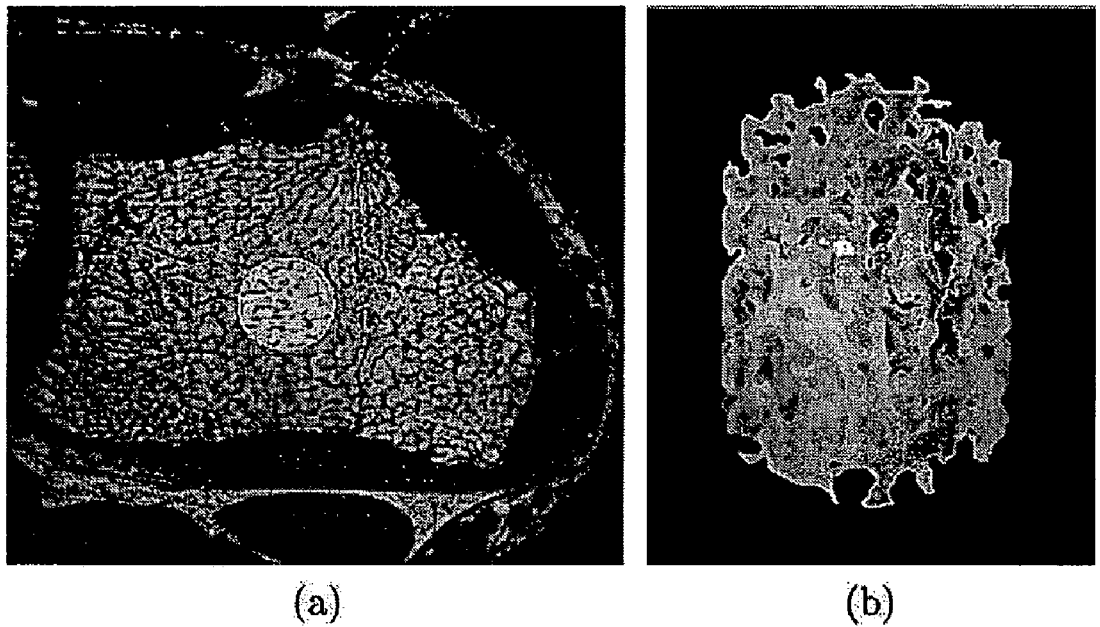
FIGS. 5a and 5b depict high-resolution in vivo 3D MR images by the FDT-based thickness computation method of the human distal radius showing trabecular bone structure.

A second example of thickness computation, illustrated in FIG. 5, is a high-resolution in vivo 3D magnetic resonance (MR) image of the human distal radius showing the trabecular bone network. The in vivo images were acquired on a 1.5 T GE clinical scanner. The image size was 512×256×32 μm³ and the voxel size was 137×137×350 μm³. A slice from the raw image is shown in FIG. 5(a). A cylindrical region of interest (ROI) was chosen for analysis. The central highlighted disk in FIG. 5(a) is the cross section of the ROI with that slice.

The image within the ROI was preprocessed by deshading and noise reduction using a histogram deconvolution method (Hwang et al., Internat. J. Imaging Systems Tech. 10:186-198 (1999)) to produce a bone volume fraction (BVF) map. The spatial resolution was enhanced to 68×68×88 μm³ using subvoxel classification (Wu et al., Magnetic Res. Med. 31:302-308 (1994)). A 3D projection of the final BVF image is presented in FIG. 5(b). The FDT image was computed from the resolution-enhanced BVF image. Thickness values were computed using a surface skeleton (Saha et al., 2000) of the bone mask. The mean and the standard deviation of thickness values along the skeleton were 102 μm and 42 μm, respectively, in good agreement with the known thickness of human bone trabecular, which is on the order 100-150 μm (Aaron et al., Clinical Orthopedics Related Res. 215:260-271 (1987)).

Figure 6:
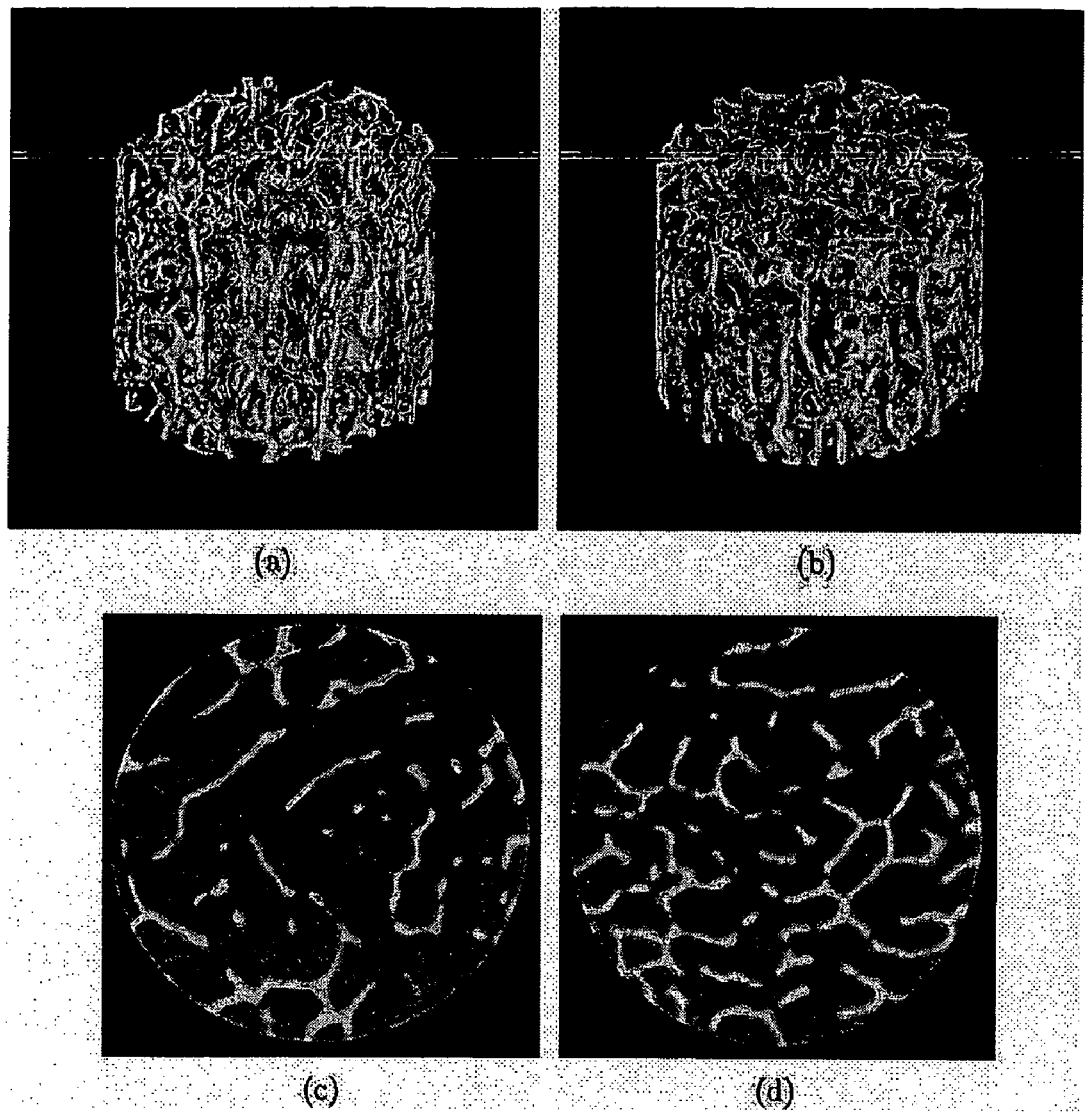
FIGS. 6(a)-6(f) demonstrate preliminary validation of FDT-based thickness method using µ-CT data of human distal radius trabecular bone by studying thickness distributions over four regions, two each from the same trabecular bone sample.
Figure 6:
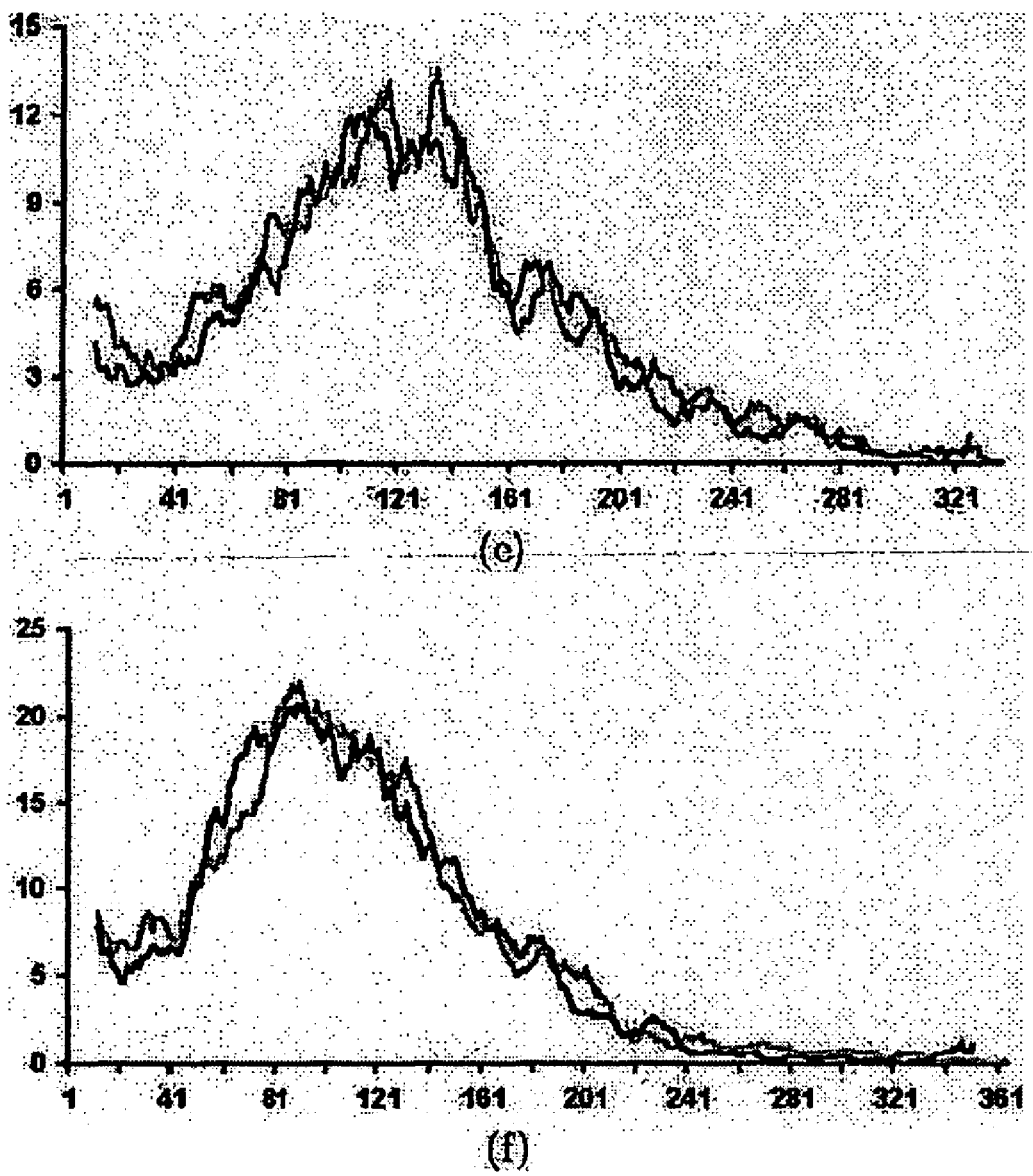

A further demonstration of the effectiveness of the proposed FDT-based thickness computation method involving high-resolution micro-computed tomography (μ-CT) images is presented in FIG. 6. The basic idea was to evaluate the FDT-based thickness distributions over four regions, two each from the same trabecular bone sample. Two μ-CT images of different metaphyseal samples of human distal radius were acquired on a SANCO Medical μ-CT 20 scanner at 22 μm isotropic resolution (although other devices and at an appropriate level of resolution could be used).

Each of the two μ-CT images was processed as follows. The raw gray-scale image was binarized to yield bone masks. A BVF map at each location within the bone mask was computed using an equation similar to Equation 13. The BVF images of the two samples are illustrated in FIGS. 6(a) and 6(b) using fuzzy shell rendering (Udupa et al., *IEEE Comput. Graphics Appl.* 13(6):58-67 (1993)), supported by the 3DVIEWNIX system (Udupa et al., *Proc. SPIE* 2164:58-73 (1994)). Two representative slices of the raw μ-CT images, one from each sample, are shown in FIGS. 6(c) and 6(d). A pair of slices, separated by 330 μm (i.e., 15 slices apart), was selected from each of the two samples and 2D FDT-based thickness was computed separately for each BVF slice image. FIG. 6(e) shows two distributions of the thickness values, one for each of the two different slices chosen from the sample shown in FIG. 6(a). The mean and standard deviations of thickness values in one slice were 119 μm and 59 μm, respectively, and the corresponding values for the other slice in the same sample were 116 μm and 62 μm, respectively. FIG. 6(f) presents thickness distributions for the two slices chosen from the other sample shown in FIG. 6(b). The mean and standard deviations of thickness values in one slice are 103 μm and 57 μm, respectively, versus values for the other slice in the same sample of 101 μm and 54 μm, respectively. As demonstrated in FIGS. 6(e) and 6(f), the thickness distributions for the slices from the same sample are quite similar while they are significantly different for the pair of slices from the other sample.

Example 3

BVF Imaging

For this and the experiments that follow, BVF object generation utilized CT images that had been acquired previously on a Scanco Medical μ-CT 20 scanner at 22 μm isotropic resolution from samples cored from cadaveric bone of the distal radial metaphysis of two donors. As above, shell rendering was by 3DVIEWNIX (Udupa et al, 1994). The samples represent cylindrical cores of 9 mm height and 9 mm diameter with the cylinder axis parallel to the direction of the radius. Because of their high spatial resolution exceeding trabecular thickness by a factor of 5, the data represent the "gold standard."

Two cross-sectional images, one from each of the two μ-CT data sets, are shown in FIGS. 8(a) and 8(b). The two CT image sets were processed to generate BVF maps. Because of the small voxel size, the images have bimodal intensity distributions and could thus be segmented by selecting a threshold ($\mu_{TH}$) at the midpoint of the two modes representing the mean bone and the mean marrow intensities. Subsequently, the largest 26-connected component (Saha et al., *CVGIP: Image Understanding* 63:418-429 (1996)) within the region thresholded for bone was computed. The intensities at the two modes were selected as the mean intensities for bone and marrow (denoted by $\mu_B$ and $\mu_M$ respectively). At each point p, the BVF value was computed through the following equation:

$$\mu_{BVF}(p) = \begin{cases} 0, & \text{if } f(P) < \mu_{TH}, \\ \dfrac{f(p) - \mu_{TH}}{\mu_B - \mu_{TH}} & \text{if } \mu_{TH} \le f(p) < \mu_B, \\ 1, & \text{otherwise,} \end{cases} \quad \text{(Equation 14)}$$

where $f$ denotes the image intensity function. 3D renditions of the BVF images generated from the two 3D t-CT data sets of trabecular bone are presented in FIGS. 8(c) and 8(d). The surface-rendered 3D images were obtained using 3DVIEWNIX supported shell rendering (Udupa et al., 1993).

For this and the following experiments, the bone sample displayed in FIG. 8(c) as sample A, and the cross section in FIG. 8(a) as slice A, are referred to herein as "sample A;" and those displayed in FIGS. 8(b) and 8(d), as sample B and slice B, respectively are referred to herein as "sample B."

For BVF Object Generation Experiment 1, the BVF images of the two bone specimens were resampled at voxel sizes corresponding to integral multiples of the parent resolution, i.e., 44 μm, 66 μm, . . . 176 μm isotropic voxel size. This strategy was chosen for generating trabecular bone images at lower resolutions, as opposed to re-sampling the raw μ-CT data sets followed by computing the BVF images as the latter strategy would cause a significant loss in structural detail in the segmented images using the simple threshold-based method as used here. Segmentation may be improved by using more sophisticated methods Udupa et al., 1996; Saha et al., 2000); however, segmentation is not a focus of the present invention. However, for Experiments 2 and 3 of this Example, the respective operations were performed on the raw μ-CT images first, and then the BVF computation method was applied.

Experiment 1

Performance of the Invention in Various Resolution Regimes.

This first experiment was designed to assess the performance of the FDT method in various resolution regimes ranging from ex vivo μ-CT to in vivo μ-MRI data. Resolution was varied isotropically from 22 μm to 176 μm, in steps of 22 μm, yielding eight different resolution values. FIGS. 9(a) and 9(b) display slices A and B from the BVF images of samples A and B at 22 μm isotropic voxel size. Matching slices from the BVF images at 88 μm and 176 μm isotropic voxel size are displayed in FIGS. 9(c)-9(f).

Figure 10:
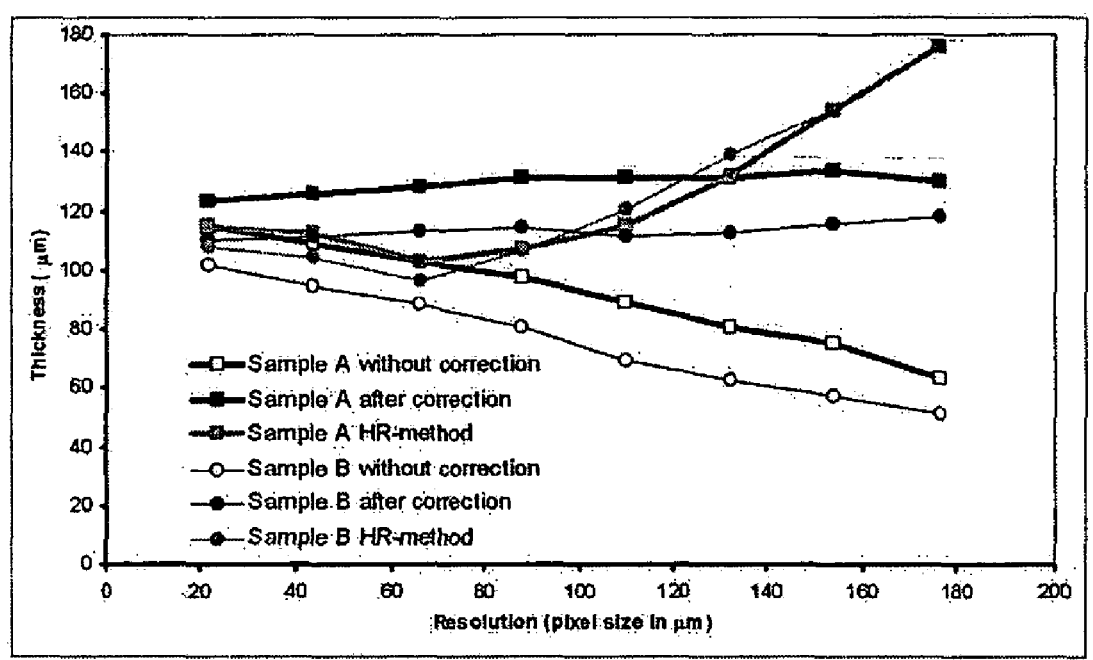
FIG. 10 graphically depicts plots of average thickness values at different resolutions with and without corrections for samples A and B. Note that without correction, the computed thickness values underestimate 'true' thickness with the magnitude of the error increasing approximately linearly with voxel resolution.

Thickness values computed for the two different μ-CT image sets at different resolutions were plotted in FIG. 10 before and after the resolution dependent corrections (Equations 10-12). In spite of the wide range of resolutions examined, the corrected thickness values were shown to be stable as shown, with a maximum variation of 7.6% for sample A, and 6.7% for sample B.

A significant error was noted, however, in the computed thickness without correction (up to 45.3% for sample A and 49.8% for sample B). The error is negative, i.e., without the correction the algorithm underestimates true thickness values as predicted. However, there is a small positive error in the corrected thickness values, which increases approximately linearly with voxel size. This overestimation may result from the artifactual filling of small lacunae (for example, see the apparent cavity shown by an arrow in FIGS. 9(a) and 9(c), which is filled in for FIG. 9(e). Likewise, merging of closely spaced trabeculae (for example, the region highlighted by an arrow in FIGS. 9(b), 9(d) and 9(f)) increased in apparent thickness at such locations. Equation 11 assumes structural anisotropy in the transverse plane. However, in reality there may be small deviations from transverse isotropy, meaning that the correction factor of Equation 11 is only approximately valid.

It should be noted from the data plotted in FIG. 10 that the present method is remarkably reliable at voxel sizes (e.g., 176 μm), exceeding trabecular thickness (approximately 124 μm and 110 μm). FIG. 10 also shows the computed thickness values using the HR method (Hildebrand et al., 1997). Although at 22 μm, the estimated thickness values derived from the two methods are close, the disparity increases at lower resolution. It is noted that the HR method completely fails at voxel sizes greater than mean trabecular bone thickness. Moreover, the smallest thickness value at any location in any image computed by HR method is the voxel size itself. Such behavior appears to be true for any threshold-based method.

Further, even at 22 µm resolution, the change in computed thickness was 24% and 32% for samples A and B, respectively, as the BVF threshold was varied from 25% to 75%.

Experiment 2

Rotation Dependence

Figure 11:
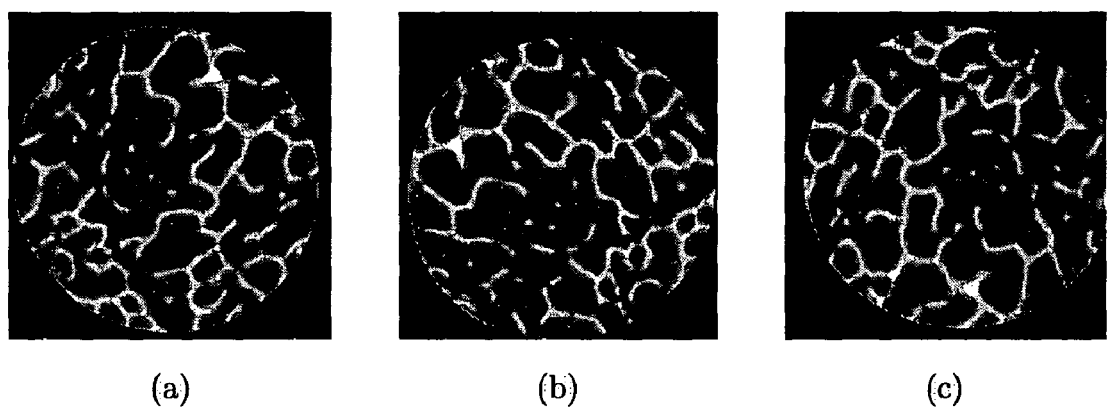
FIGS. 11(a)-11(c) depict images of a slice from sample B for three different rotation angles around its z-axis.
Figure 12:
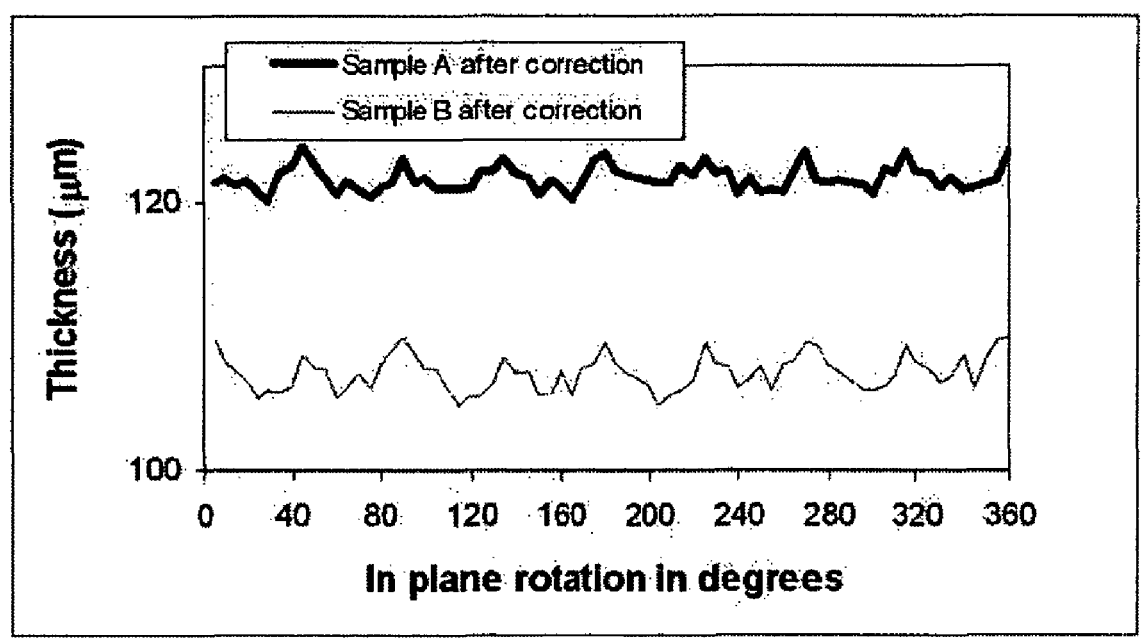
FIG. 12 graphically depicts plots of average thickness values at different in plane rotations around the z-axis (the axis along the slice direction). Rotation-thickness plots show periodic peaks at integral multiples of 45°.

This experiment demonstrates the performance of the present method under object rotation. Thickness values were computed for the trabecular bone networks after the images were rotated in-plane, anticlockwise in steps of 5° over a range of 0° to 360° around the z-axis (axis perpendicular to image plane). $\theta \in \{15, 10, \ldots 355\}$ degrees were applied to each raw µ-CT image, and the rotated images were digitized in the original cubic grid using linear interpolation. Images of a slice from sample B for three different rotation angles are illustrated in FIG. 11, and the results of this experiment are plotted in FIG. 12.

BVF images were computed using Equation 14. Notably, the variations in measured thickness do not exceed 3.3% and 4.5%, for samples A and B, respectively. Both rotation-thickness plots show a periodicity at integral multiples of 45°. This observation is consistent with the behavior of digital cubic grids in which effects of rotation are largest around 45° and its integral multiples.

Experiment 3

Noise Dependence.

Figure 13:
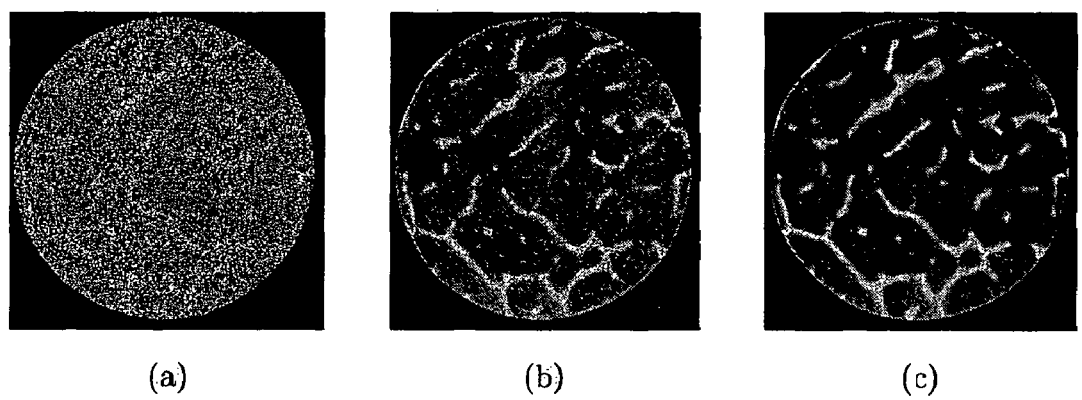
FIGS. 13(a)-13(c) depict slice A after adding zero mean, multiplicative random noise at different SNR.
Figure 14:
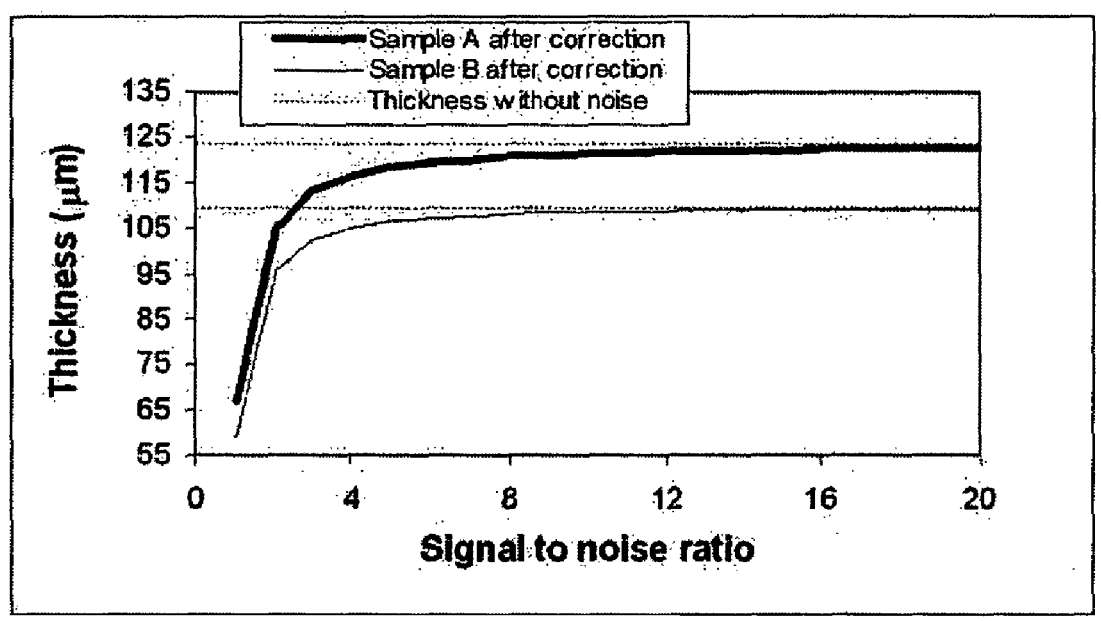
FIG. 14 graphically depicts the performance of the FDT method under varying signal-to-noise ratios.

This experiment was designed to examine the sensitivity of the present method to noise. FIG. 13 displays slice A for three different SNR values, while plots of apparent thickness versus SNR are illustrated in FIG. 14. Zero mean, multiplicative random noise corresponding to $SNR \in \{1, 2, \ldots 20\}$ was added to the µ-CT images of samples A and B. The SNR value was calculated as the ratio between the mean and standard deviation of intensities over a sufficiently large marrow region. As in the previous Example, BVF images were computed using Equation 14.

Notably, at very low SNR values (<5), computed thickness values were substantially underestimated (almost 50%). However, above SNR≈5 the values stabilized, asymptotically approaching their noise-free values. For SNR>5, variations in estimated thickness value for the two samples were less than 3.5% and 2.7%, respectively. The likely cause for the method to break down at very low SNR is the creation of tiny cavities and lacunae in the support of trabeculae caused by noise, thus increasing apparent bone skeletal area, resulting in an artifactual reduction in computed thickness.

Experiment 4

Reproducibility.

This experiment was designed to examine to what extent spatially close slice locations in the same specimen return similar thickness values. The hypothesis to test was that two similar locations within a volume of trabecular bone volume would yield similar thickness distributions (since, the trabecular architecture varies continuously along the slice direction). In contrast to the preceding examples, images were used only from individual slices. Specifically, images from two slice locations separated by 330 µm (15 slices) were selected from each of the BVF images of samples A and B. The rationale underlying this experiment is the notion that the structural characteristics found within the bone of a particular donor had to be more similar than those in bone from different donors.

Figure 15:
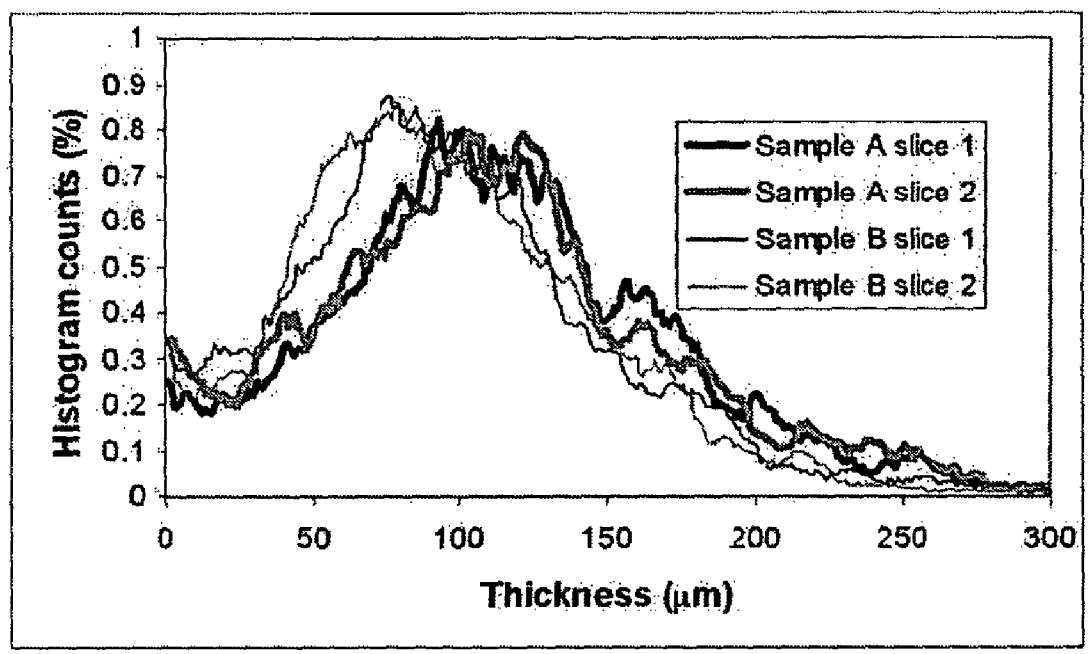
FIG. 15 graphically depicts two pairs of FDT-based trabecular bone thickness distributions (without resolution dependent corrections). Each is for a pair of spatially close slice locations from samples A and B.

As shown in FIG. 15, two pairs of FDT-based trabecular bone thickness distributions are displayed without resolution dependent corrections, each for the pair of slices from one of the two samples.

Notably, from these plots that thickness distributions for the slices from the same sample are quite similar while differing substantially for the slices originating from different samples.

Example 4

Reproducibility of Method In Vivo

A first experiment was aimed at evaluating the reproducibility of the proposed trabecular bone thickness computation method in human subjects using in vivo µ-MRI data. Therefore, high-resolution images of the distal radius in four human volunteers were examined. Each individual had been previously scanned three times with repositioning and reset apparatus-setup as part of a project designed to evaluate the serial reproducibility of trabecular bone structural parameters. Image data sets consisted of 28 slices of 137×137 µm² pixel size having 350 µm thickness, obtained with the 3D FLASE partial flip-angle spin-echo sequence (Ma et al., *Magnet. Reson. Med.* 35:903-910 (1996); Song et al., *Magnet. Reson. Med.* 41:947-953 (1999)). For each image, an actual volume of interest (VOI) for which thickness was computed was generated by manually tracing boundaries on each slice using an IDL-based graphical interface running on a Pentium III PC under MS Window OS. The data encompassed by the VOI were preprocessed by deshading and noise reduction using a histogram deconvolution method (Hwang et al., 1999) to produce a set of BVF images. SNR values ranged between 12 to 14.

Figure 9:
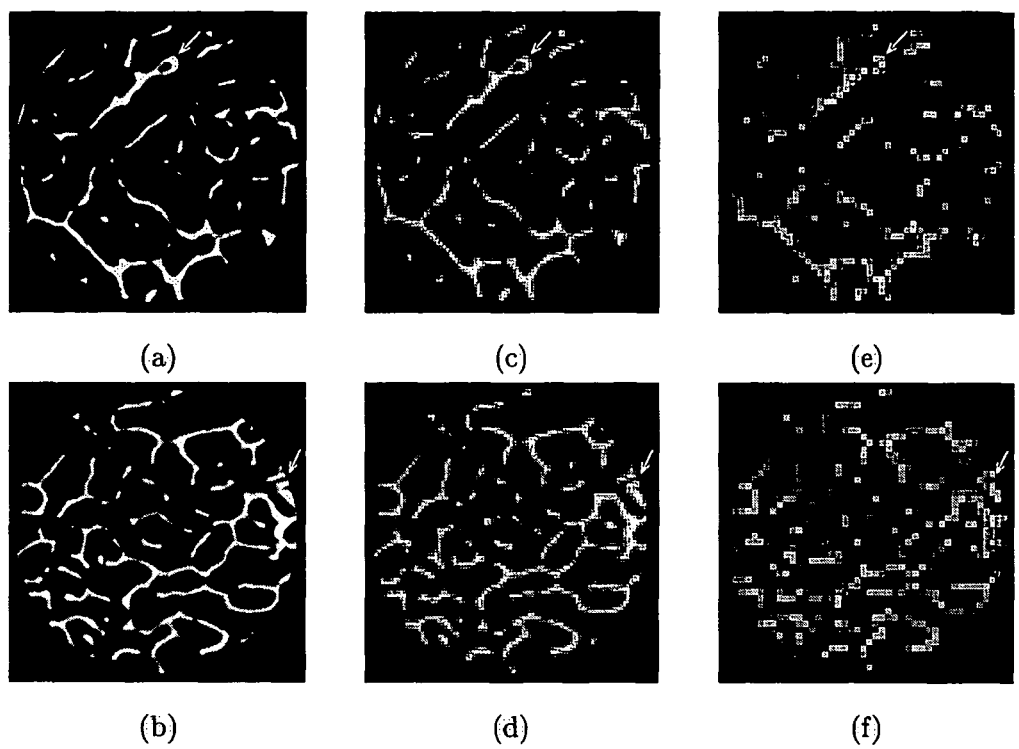
FIGS. 9(a)-9(f) depict images at comparative resolution values.
Figure 16:
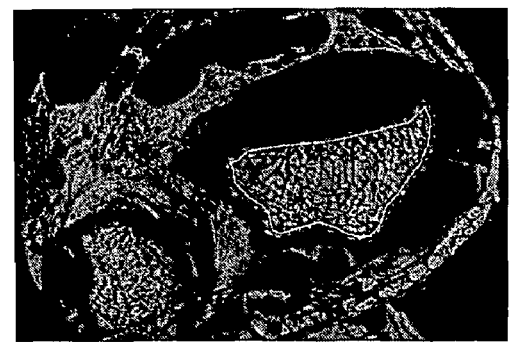
FIGS. 16(a)-16(d) demonstrates the reproducibility of the FDT-derived trabecular bone thickness determinations for in vivo situations.
Figure 16:
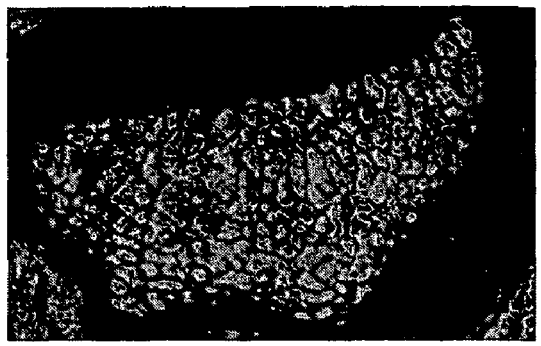
Figure 16:
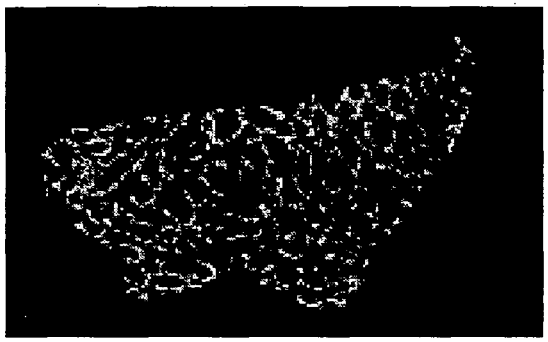
Figure 16:
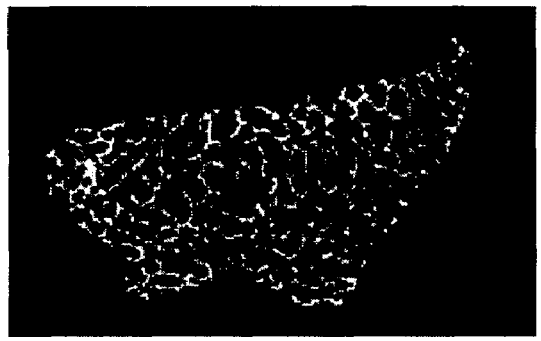

An unprocessed µ-MR image is shown in FIG. 16(*a*), and a zoomed region of interest from the same slice is displayed in FIG. 16(*b*). The boundary of the VOI, used for thickness computation, for the particular slice is also shown FIG. 16(*a*). A matching slice image from the BVF data is shown in FIG. 9(*c*), along with the computed FDT map (FIG. 16(*d*)).

The results of these experiments are important because they determine the power of the method in longitudinal studies, designed, for example, to evaluate the efficiency of treatment. The reproducibility data yielded trabecular bone thickness means ranging from 93 to 124 µm. This analysis resulted an average coefficient of variation of 3.0% and an intra-class correlation coefficient of 0.96. Such precision allows monitoring of progression or regression of disease in serial drug intervention studies as discussed below.

A second experiment was directed toward to evaluating the performance of a method of the present invention in a longitudinal study designed to evaluate the effect of supra-physiological levels of corticosteroids on trabecular bone. Detecting the effect of steroid treatment was selected because it is a well known cause of thinning of trabecular bone.

Figure 17:
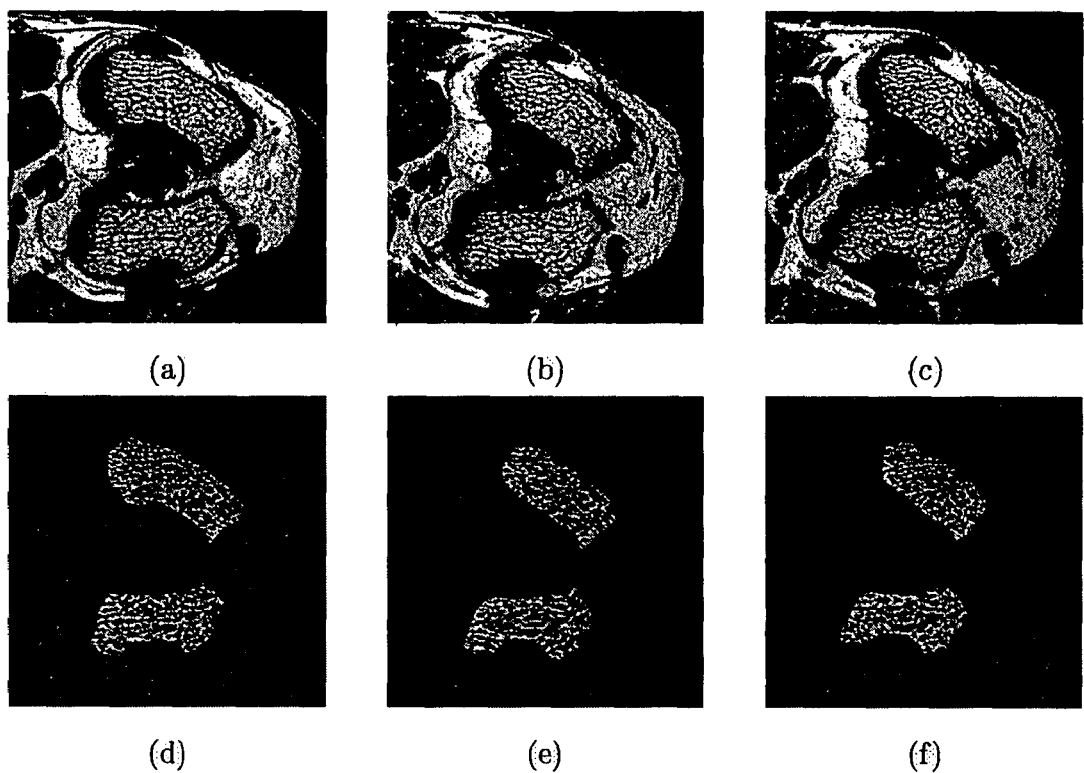
FIGS. 17(a)-17(f) depict visually matched cross-sectional images (distal femoral epiphysis) of a dexamethasone treated rabbit studied at three time points.

For this purpose, data from a study conducted on rabbits which had received dexamethasone (a synthetic analog of cortisol) as a means to induce bone atrophy (Takahashi et al.,

*Proc. Natl. Acad. Sci. USA* 19:19 (2002)), were re-examined. In brief, the protocol involved eleven New Zealand white rabbits that either received dexamethasone (0.4 mg/kg/day, N=6), or were sham operated (N=5). Images were obtained at three time points, first at baseline and subsequently at four (4) and eight (8) weeks after the beginning of the corticosteroid-treatment. MR images of the distal femur epiphysis were acquired with the FLASE pulse sequence used in the previously described human subject study, affording 28 contiguous slices of $97 \times 97 \times 300$ m$^3$ voxel size. The visually matched images of µ-MRI data sets (SNR values between 9 and 11), as illustrated at FIG. 17, were subsequently processed to yield BVF maps using a method analogous to the one used for human radius images.

Figure 18:
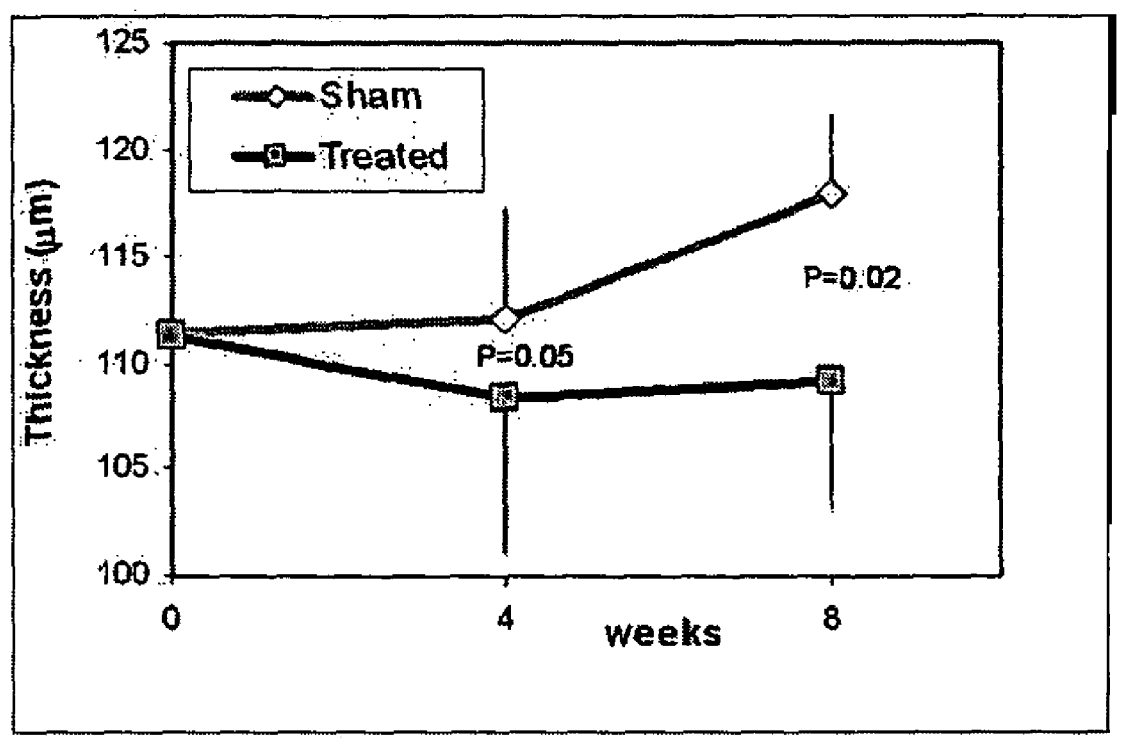
FIG. 18 graphically depicts the effect of corticosteroid exposure on rabbit trabecular bone. "Sham" represents the sham-operated (untreated) group, while "treated" represents the corticosteroid-treated group. Plots represent mean average thickness values (after resolution-dependent correction) for three time points described in FIG. 17, i.e., baseline, 4-weeks, and 8-weeks. Vertical bars represent standard deviations.
Figure 19:
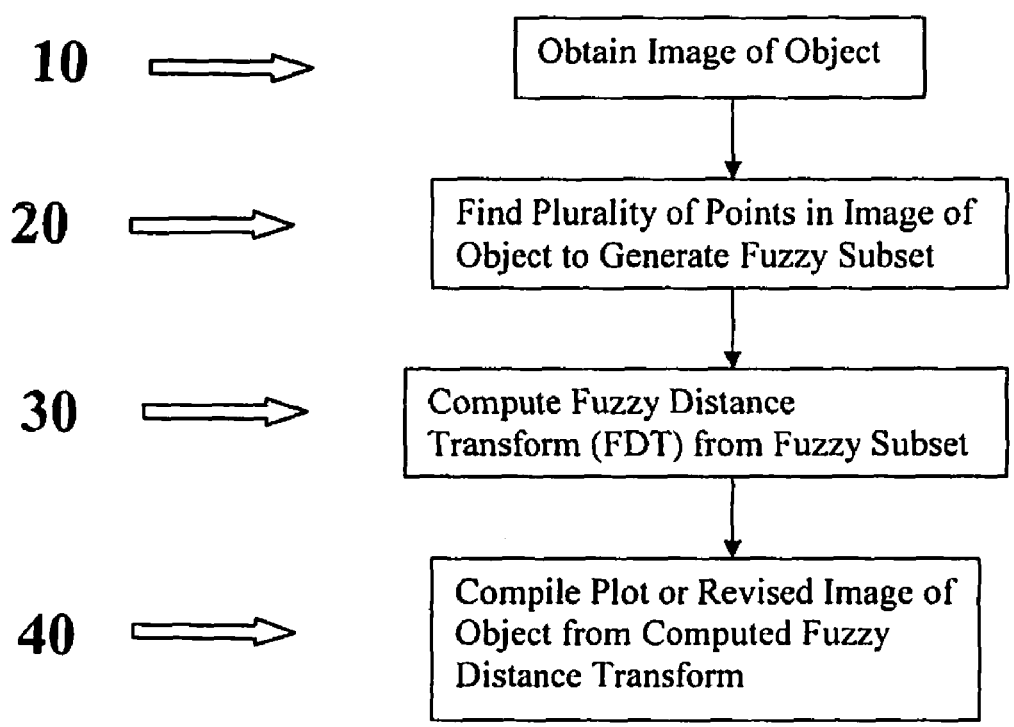
FIG. 19 is a flowchart, showing element 10 as a box stating Obtain Image of Object; element 20 as a box stating Find Plurality of Points in Image of Object to Generate Fuzzy Subset; element 30 as a box stating Compute Fuzzy Distance Transform (FDT) from Fuzzy Subset, and element 40 as a box stating Compile Plot or Revised Image of Object from Computed Fuzzy Distance Transform.

The hypothesis tested was that the corticosteroid-treated rabbit group would lose bone due to thinning of trabeculae relative to the sham-operated (control) animals. The results of FDT-derived thickness analysis of image data collected previously (Takahashi et al., 2002) are plotted in FIG. 18. The plots show the mean average thickness values (after resolution-dependent correction) for each group at each of the three time points—baseline, 4-weeks, and 8-weeks from onset of treatment. The data confirm the short-term effect of corticosteroid treatment on trabecular bone, indicating relative decreases in trabecular bone thickness of 2.8% at 4-weeks and 8.4% at 8-weeks. By contrast, however, trabecular thickness increased in the sham-operated group by 0.55% at 4-weeks and 5.3% at 8-weeks. The differences between treated and controlled groups were statistically significant (p 0.05 at 4 weeks and p=0.02 at 8 weeks).

Although bone loss in humans may be slower than in animal models, trabecular thinning subsequent to glucocorticoid treatment can be quite fast. As the data above show, bone loss and the concomitant reduction in trabecular thickness can be extraordinarily rapid. Studies on the basis of histomorphometry on iliac bone biopsies in patients on short-term glucocorticoid treatment exhibited a reduction in trabecular thickness of about 20% relative to age-matched women with postmenopausal osteoporosis (Carbonare et al., *J. Bone Miner. Res.* 16:97-103 (2001)). Similarly, short-term administration of parathyroid hormone was found to substantially increase trabecular thickness (Bradbeer et al., *Clin. Endocrinol.* (*Oxf*) 37:282-289 (1992)). Thus, the effects detected in the present studies are of the same order as those presented above in a rabbit model of steroid-induced osteopenia, supporting the conclusion that the present methods provide an improved capability to follow patients during treatment.

These observations were confirmed by the mean thickness values. Thus, as shown by the disclosed experiments, the thickness value computed using the methods of the present invention is an intrinsic property of trabecular bone at a particular skeletal location in a subject, although these particular values may be differ for corresponding locations in different subjects.

The disclosures of each patent, patent application and publication cited or described in this document are hereby incorporated herein by reference, in their entirety.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention. Such modifications and additional embodiments are also intended to fall within the scope of the appended claims.

What is claimed is:

1. A fuzzy distance transform-based computational method for analyzing digital images defining a volumetric region of an object from an image comprising:
    (a) obtaining an image of the targeted object, comprising bone, bone marrow space, cortical bone, blood vessels or combinations thereof;
    (b) finding a plurality of points in the image to generate a fuzzy subset and computing a fuzzy distance transform (FDT) of the fuzzy subset, comprising sampling FDT values along a medial axis of a support of the fuzzy subset to estimate regional target object thickness distribution and assigning to a point in the fuzzy subset, its respective fuzzy distance from a complement of a support of the fuzzy subset;
    (c) compiling a computer processed plot or revised image based upon the computed FDT; and
    (d) displaying same in high resolution.

2. The method of claim 1, wherein the support comprises a set of all points in the fuzzy subset with a value greater than or equal to a support value.

3. The method of claim 2, wherein the FDT is in digital cubic space.

4. The method of claim 2, further comprising applying one or more additional steps consisting of skeletonizing, feature extracting; analyzing morphological or shape-based object, computing regional object depth; calculating average or regional object thickness distribution; and local scaling.

5. The method of claim 1, wherein the target object is in or from an animal or human subject.

6. The method of claim 1, wherein the image is obtained by magnetic resonance or computed tomography.

7. The method of claim 6, wherein the targeted object is in or from an animal or human subject.

8. The method of claim 1, whereby FDT values are sampled along a medial axis directly computed from the fuzzy subset.

9. The method of claim 8, wherein the FDT is in digital cubic space.

10. The method of claim 9, wherein FDT is computed in digital cubic space of resolution of target object thickness or smaller.

11. The method of claim 1, further comprising calculating structural thickness of an object from the digital image, wherein a dynamic programming-based algorithm using a plurality of points in a digital image of a target object is used for generating the fuzzy subset, and for calculating the FDT of the fuzzy subset, the FDT terminating in a finite number of steps.

12. The method of claim 11, wherein the support comprises a set of all points in the fuzzy subset with a value greater than or equal to a support value.

13. A fuzzy distance transform-based computational method for analyzing digital images defining at least one volumetric region of bone from or in the subject, the method comprising:
    (a) obtaining an image of targeted bone region;
    (b) finding a plurality of points in the image to generate a fuzzy subset and computing a fuzzy distance transform (FDT) of the fuzzy subset, comprising sampling FDT values along a medial axis of a support of the fuzzy subset to estimate regional target object thickness distribution and assigning to a point in the fuzzy subset its respective fuzzy distance from a complement of a support of the fuzzy subset;

(c) compiling a computer processed plot or revised image based upon the computed FDT; and (d) displaying same in high resolution.

14. The method of claim 13, wherein the support comprises a set of all points in the fuzzy subset with a value greater than or equal to a support value.

15. The method of claim 13, further comprising diagnosing or evaluating bone disease in the subject.

16. The method of claim 15, further comprising selecting a therapy based on the diagnosis or evaluation of bone disease in the subject.

17. The method of claim 16, further comprising administering the therapy to the subject.

18. The method of claim 17, wherein the evaluation further comprises monitoring a progression or regression of bone disease in the subject, during or at one or more times after administering the selected therapy.

19. The method of claim 13, further comprising calculating structural thickness of an object from the digital image, wherein a dynamic programming-based algorithm using a plurality of points in a digital image of a target object is used for generating the fuzzy subset, and for calculating the FDT of the fuzzy subset, the FDT terminating in a finite number of steps.

20. The method of claim 19, wherein the support comprises a set of all points in the fuzzy subset with a value greater than or equal to a support value.

21. The method of claim 20, wherein the FDT is in digital cubic space.

* * * * *